(12) United States Patent
Lee et al.

(10) Patent No.: US 11,140,410 B2
(45) Date of Patent: Oct. 5, 2021

(54) METHOD AND DEVICE FOR PROCESSING VIDEO SIGNAL USING AFFINE MOTION PREDICTION

(71) Applicant: LG ELECTRONICS INC, Seoul (KR)

(72) Inventors: Jaeho Lee, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/124,041

(22) Filed: Dec. 16, 2020

(65) Prior Publication Data

US 2021/0120265 A1 Apr. 22, 2021

Related U.S. Application Data

(63) Continuation of application No. PCT/KR2019/007115, filed on Jun. 13, 2019.

(30) Foreign Application Priority Data

Jun. 18, 2018 (KR) .......................... 10-2018-0069509

(51) Int. Cl.
*H04N 19/52* (2014.01)
*H04N 19/139* (2014.01)
(Continued)

(52) U.S. Cl.
CPC ............ *H04N 19/52* (2014.11); *H04N 19/139* (2014.11); *H04N 19/157* (2014.11); *H04N 19/176* (2014.11)

(58) Field of Classification Search
CPC ..... H04N 19/139; H04N 19/157; H04N 19/176
See application file for complete search history.

(56) References Cited

U.S. PATENT DOCUMENTS

| 9,712,823 B2 * | 7/2017 | Min | .................. | H04N 19/159 |
| 10,560,712 B2 * | 2/2020 | Zou | .................. | H04N 19/513 |

(Continued)

FOREIGN PATENT DOCUMENTS

| KR | 10-2017-0100211 A | 9/2017 |
| WO | 2011/013253 A1 | 3/2011 |

OTHER PUBLICATIONS

Jianle Chen et al., "Algorithm Description of Joint Exploration Test Model 3", Joint Video Exploration Team (JVET) of ITU-T SG 16 WP 3 and ISO/IEC JTC 1/SC 29/WG 11, May 26-Jun. 1, 2016, JVET-C1001 v1, XP030150223.

(Continued)

*Primary Examiner* — Tsion B Owens
(74) *Attorney, Agent, or Firm* — Dentons US LLP

(57) ABSTRACT

A method for processing a video signal using an affine motion prediction is disclosed. The method includes checking that a current block is encoded by the affine motion prediction, obtaining motion vectors for a plurality of control points of the current block, determining a motion vector for each of a plurality of subblocks included in the current block based on the motion vectors for the plurality of control points, and performing a prediction for the current block from the motion vector for each of the plurality of subblocks, wherein each of the plurality of subblocks is configured to have a pre-defined width and a pre-defined height.

8 Claims, 22 Drawing Sheets

(51) Int. Cl.
*H04N 19/157* (2014.01)
*H04N 19/176* (2014.01)

(56) References Cited

U.S. PATENT DOCUMENTS

| | | |
|---|---|---|
| 2017/0332095 A1 | 11/2017 | Zou et al. |
| 2018/0098062 A1 | 4/2018 | Li et al. |
| 2018/0098063 A1 | 4/2018 | Chen et al. |
| 2019/0158870 A1* | 5/2019 | Xu .................. H04N 19/51 |
| 2019/0335170 A1* | 10/2019 | Lee .................. H04N 19/52 |

OTHER PUBLICATIONS

Jie Zhao et al., "On Affine Motion Vectors", Joint Video Exploration Team (JVET) of ITU-T SG 16 WP 3 and ISO/IEC JTC 1/SC 29/WG 11, Oct. 15-21, 2016, JVET-D0151, XP030257466.

Matthias Narroschke et al., "Extending HEVC by an affine motion model", 2013 Picture Coding Symposium (PCS), IEEE, Dec. 8, 2013, pp. 321-324, XP032566989.

* cited by examiner

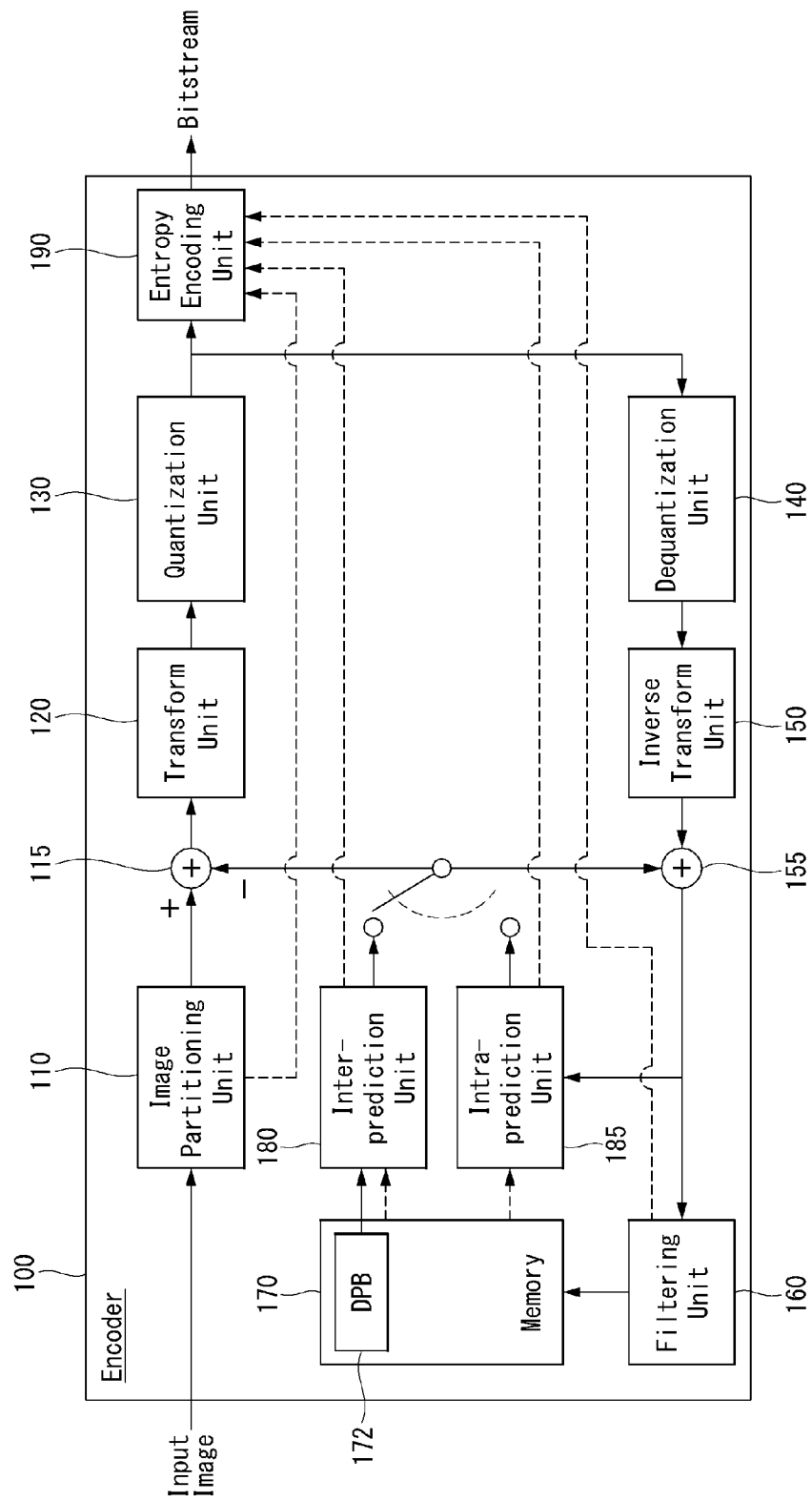
[FIG. 1]

[FIG. 2]
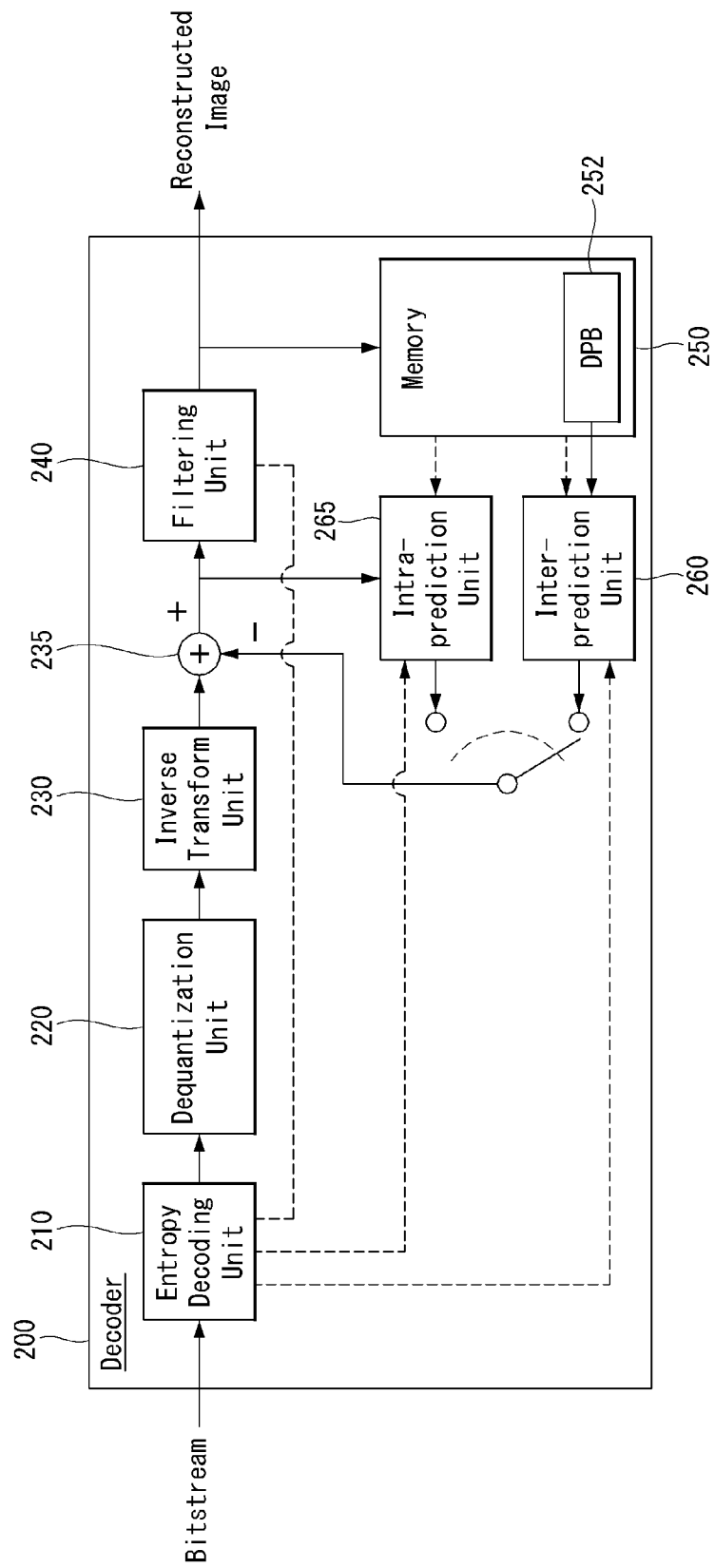

[FIG. 3]
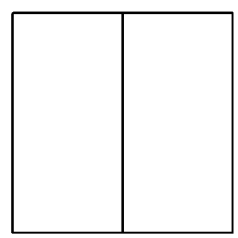  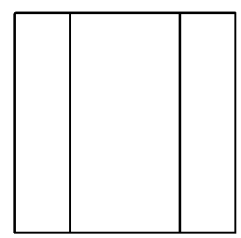 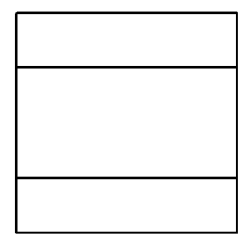
SPLIT_BT_VER   SPLIT_BT_HOR   SPLIT_TT_VER   SPLIT_TT_HOR

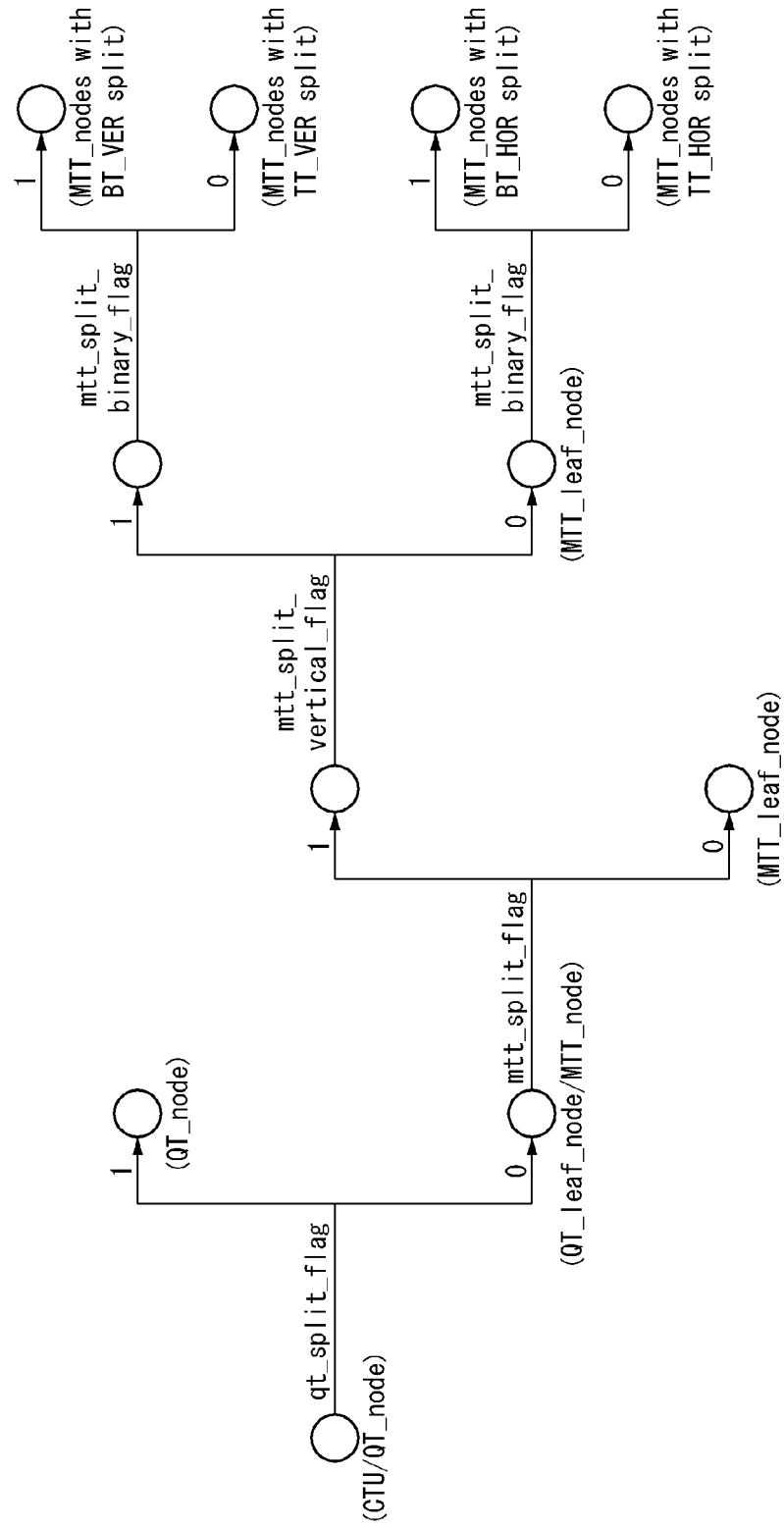
[FIG. 4]

[FIG. 5]
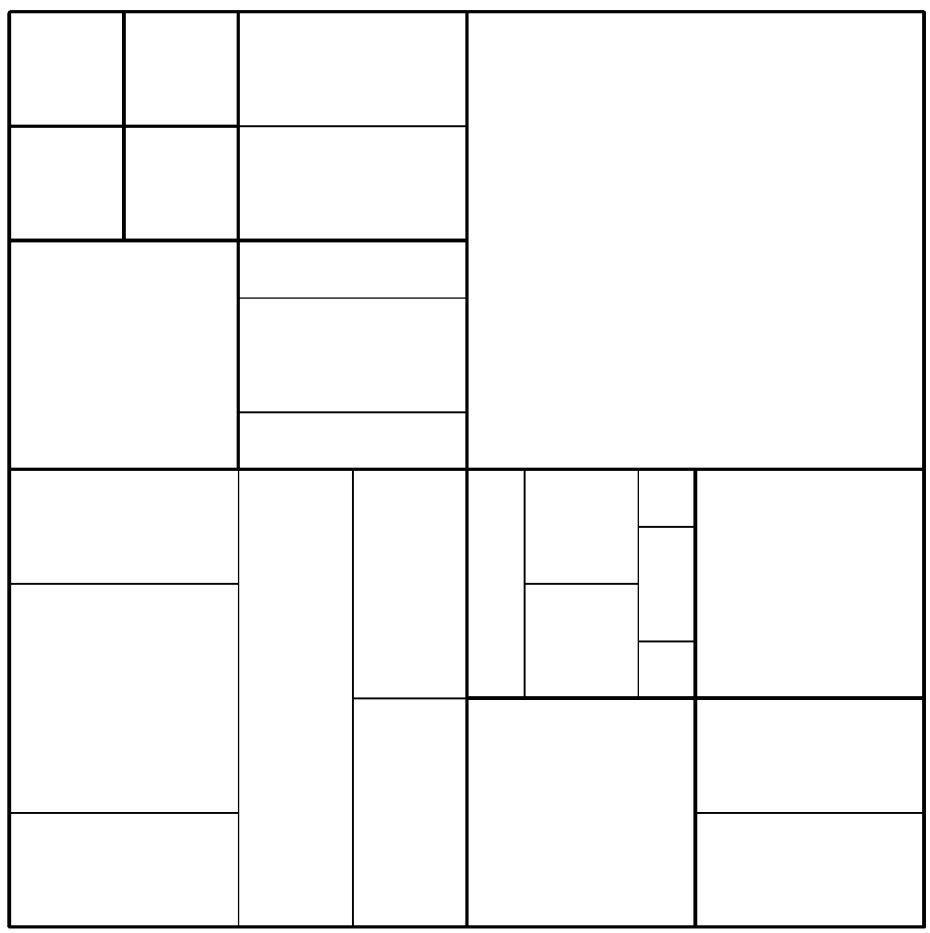

[FIG. 6]
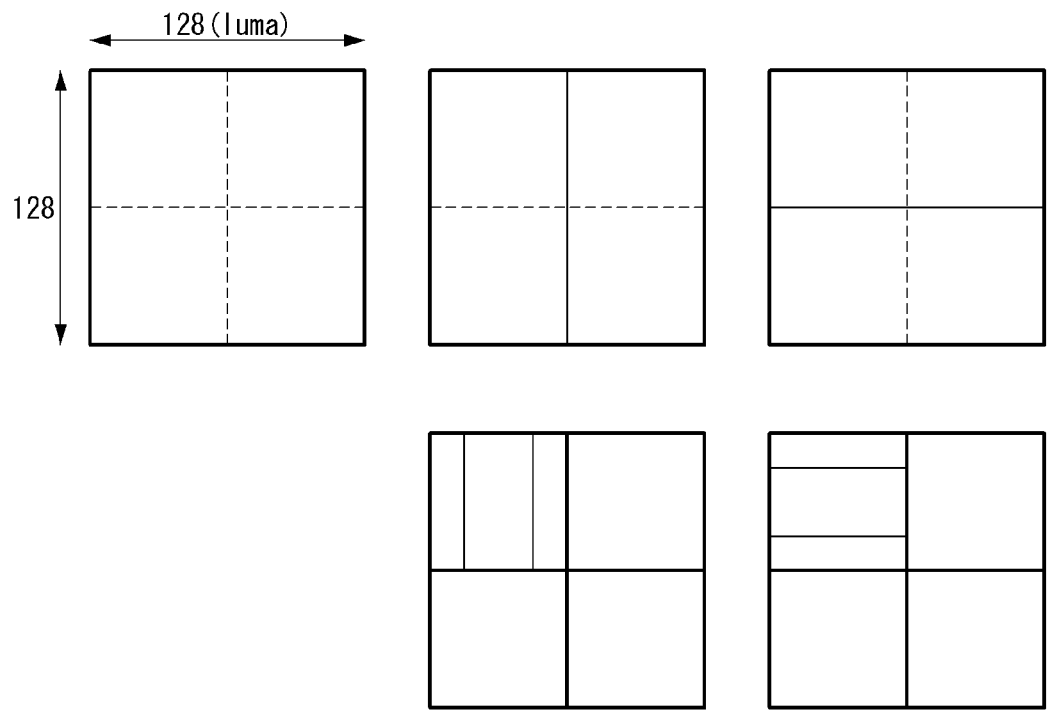
[FIG. 7]
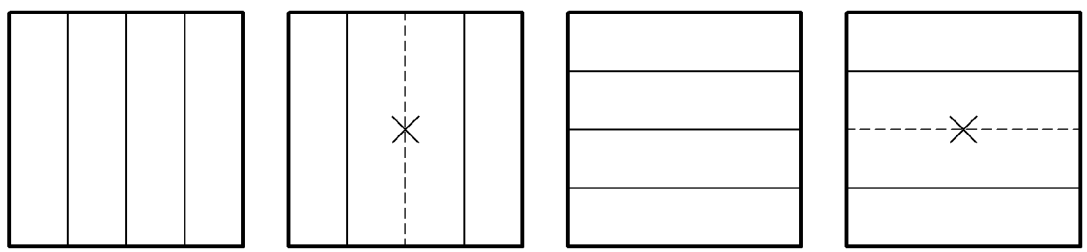

[FIG. 8]
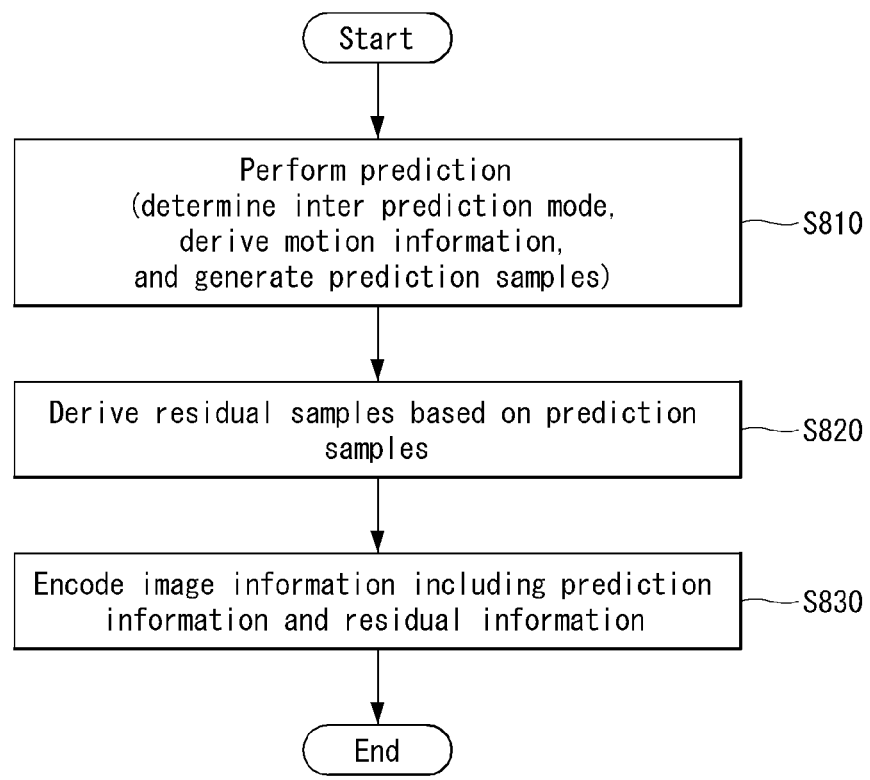

[FIG. 9]
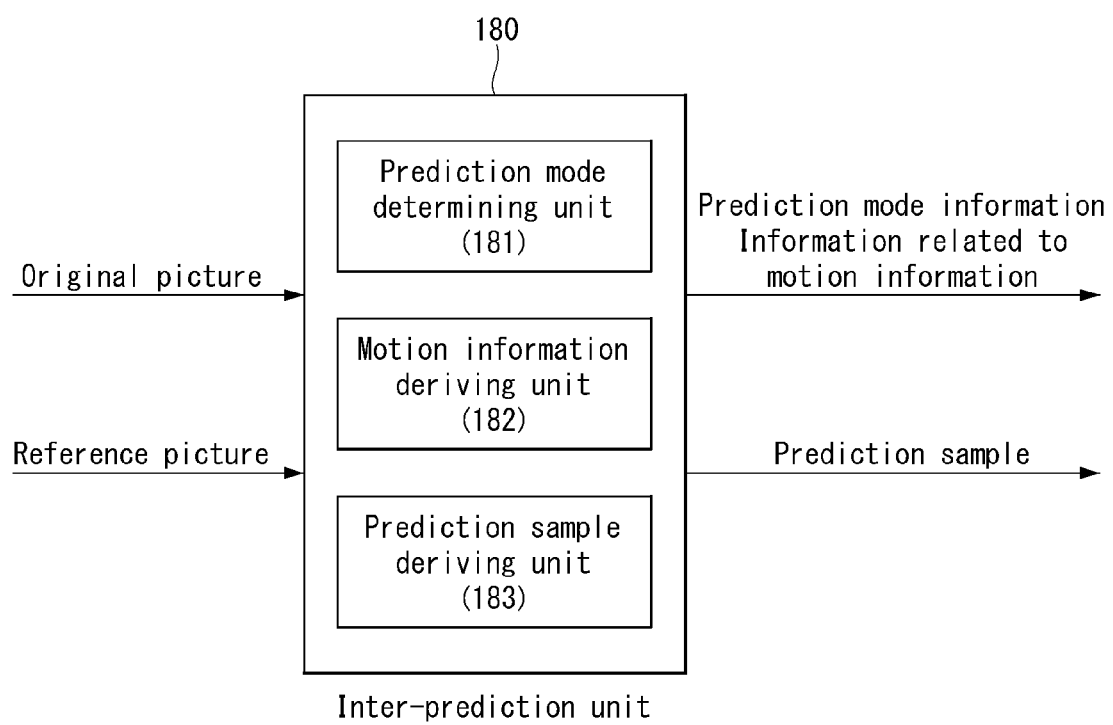

[FIG. 10]
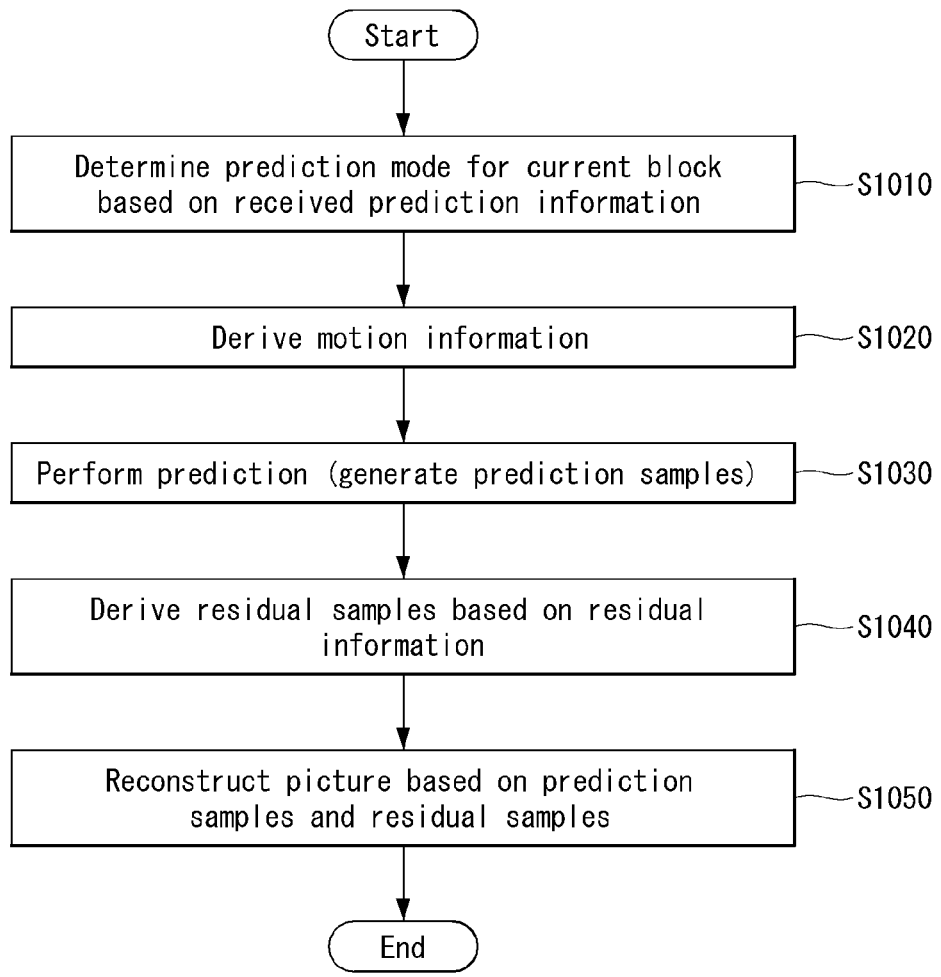

[FIG. 11]
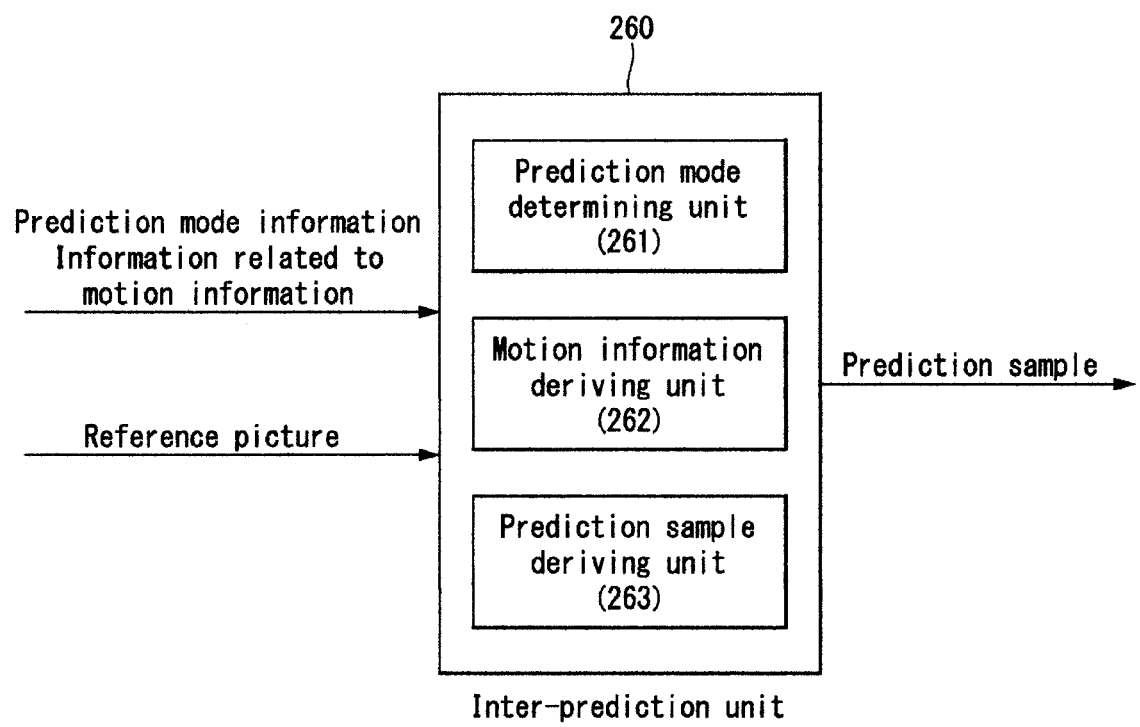

[FIG. 12]
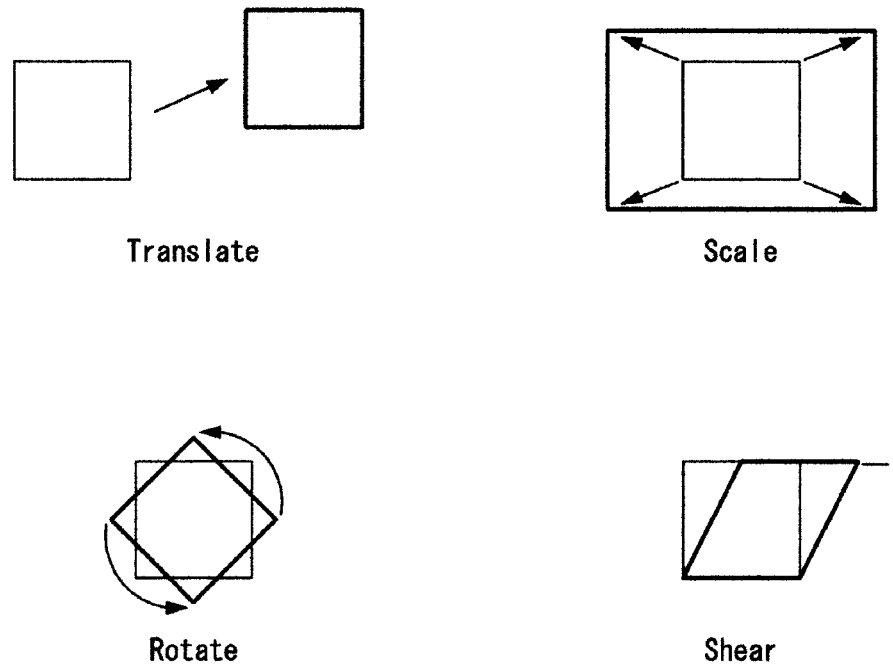
Translate
Scale
Rotate
Shear
[FIG. 13]
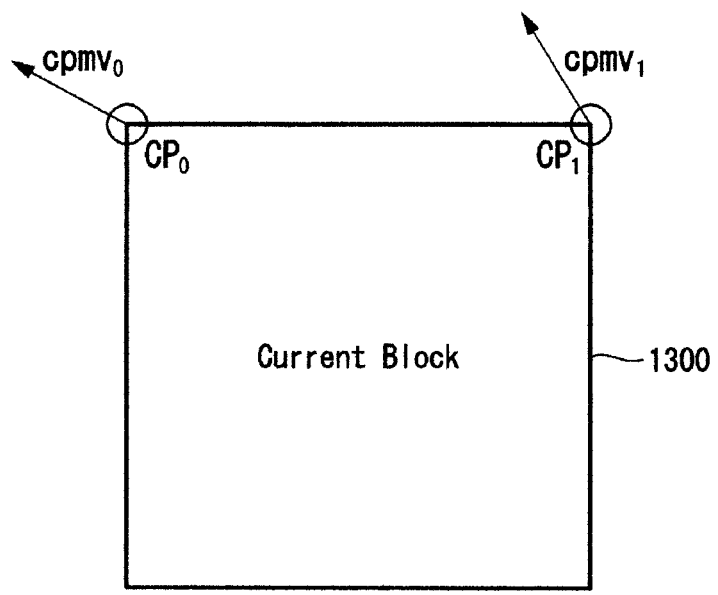

[FIG. 14]
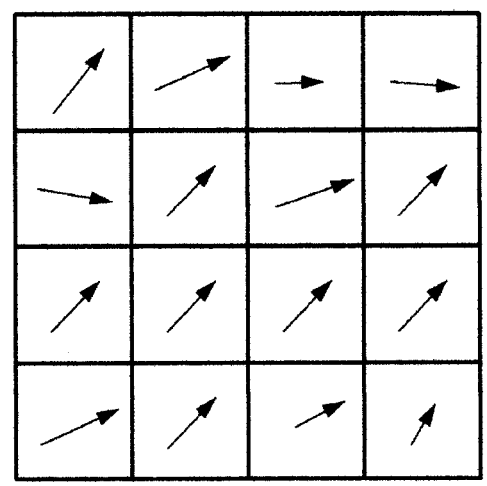

[FIG. 15]
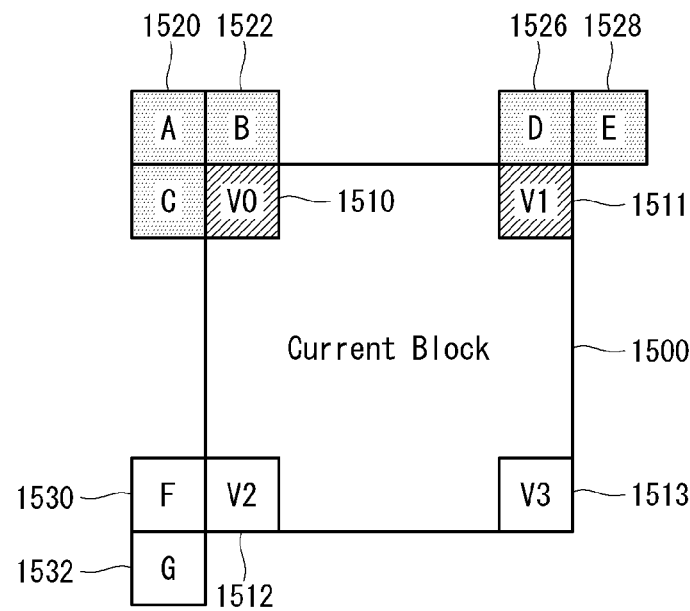
[FIG. 16]
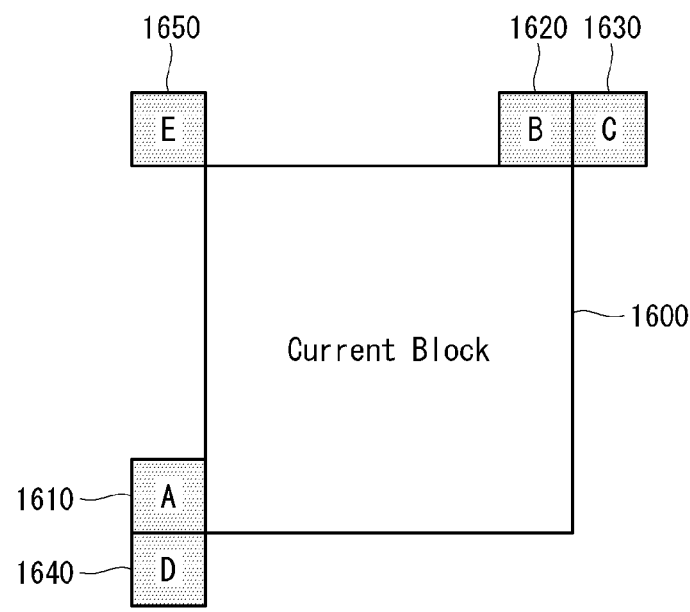

[FIG. 17]
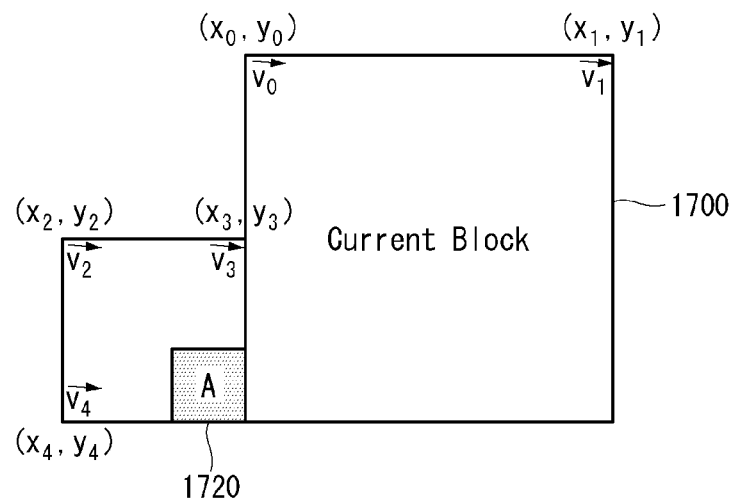
[FIG. 18]
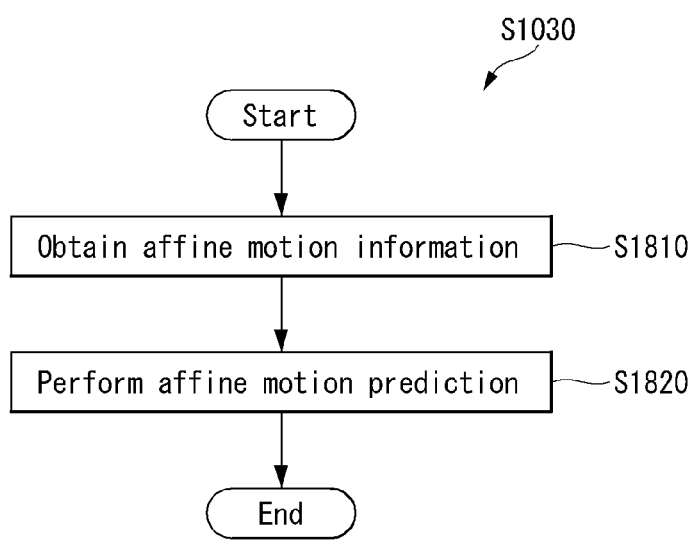

[FIG. 19]
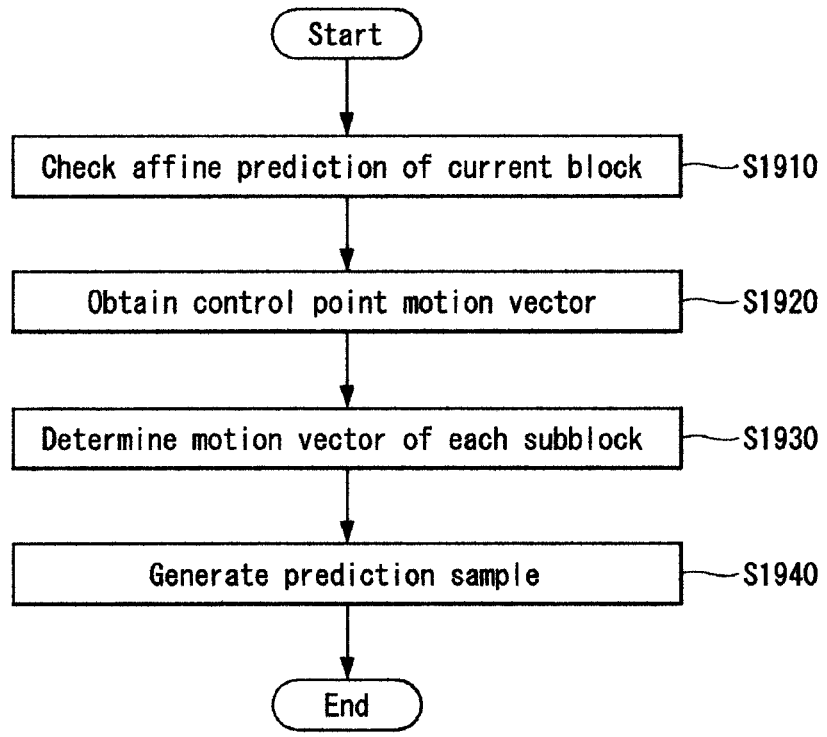

[FIG. 20]
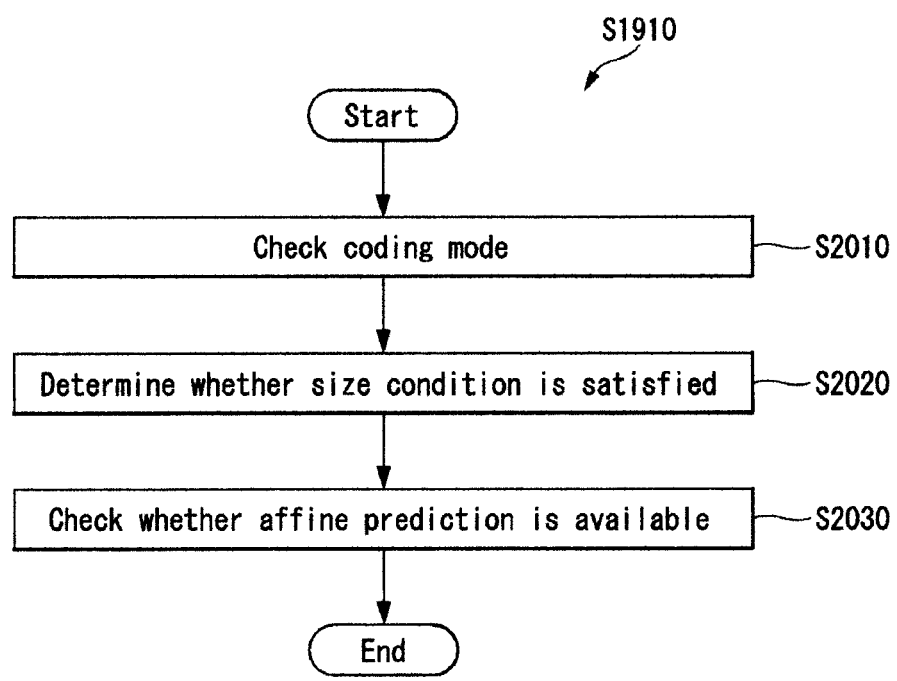

[FIG. 21a]
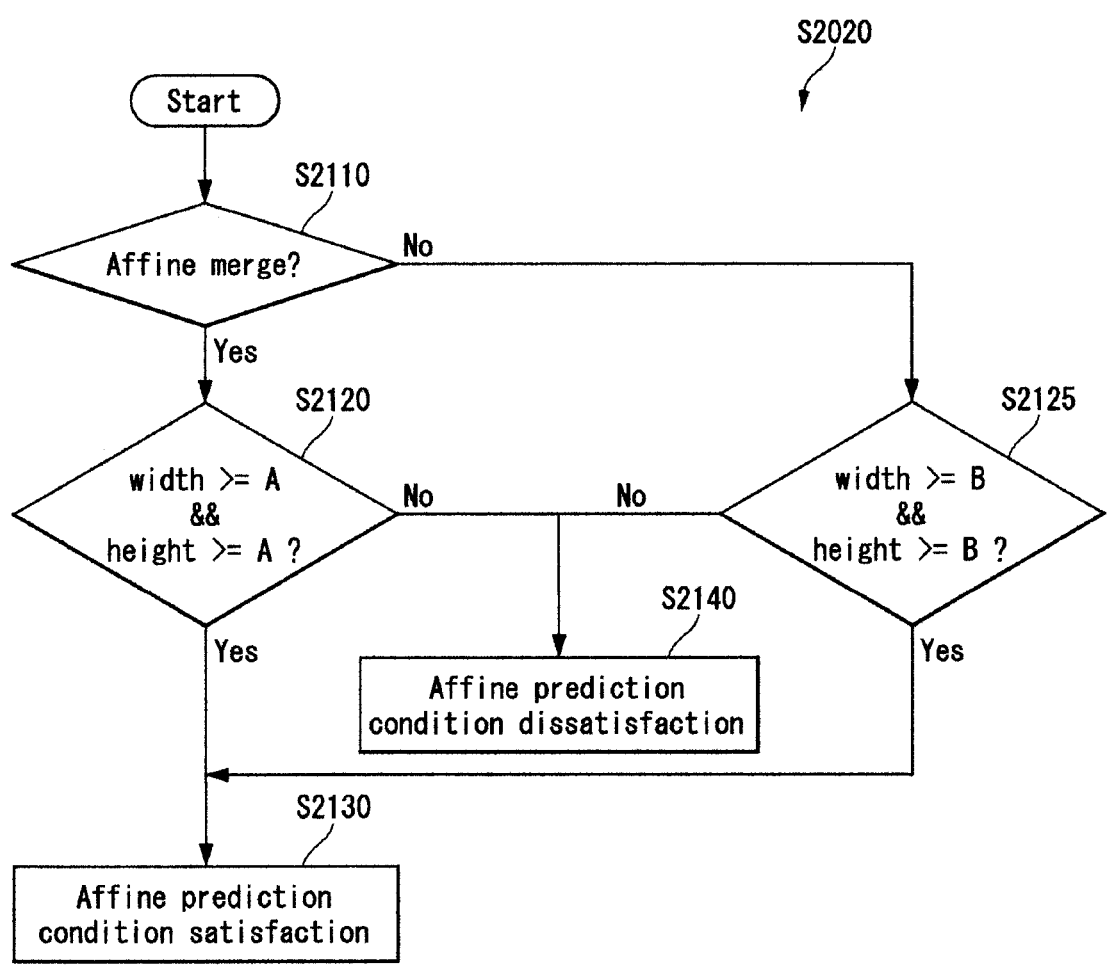

[FIG. 21b]
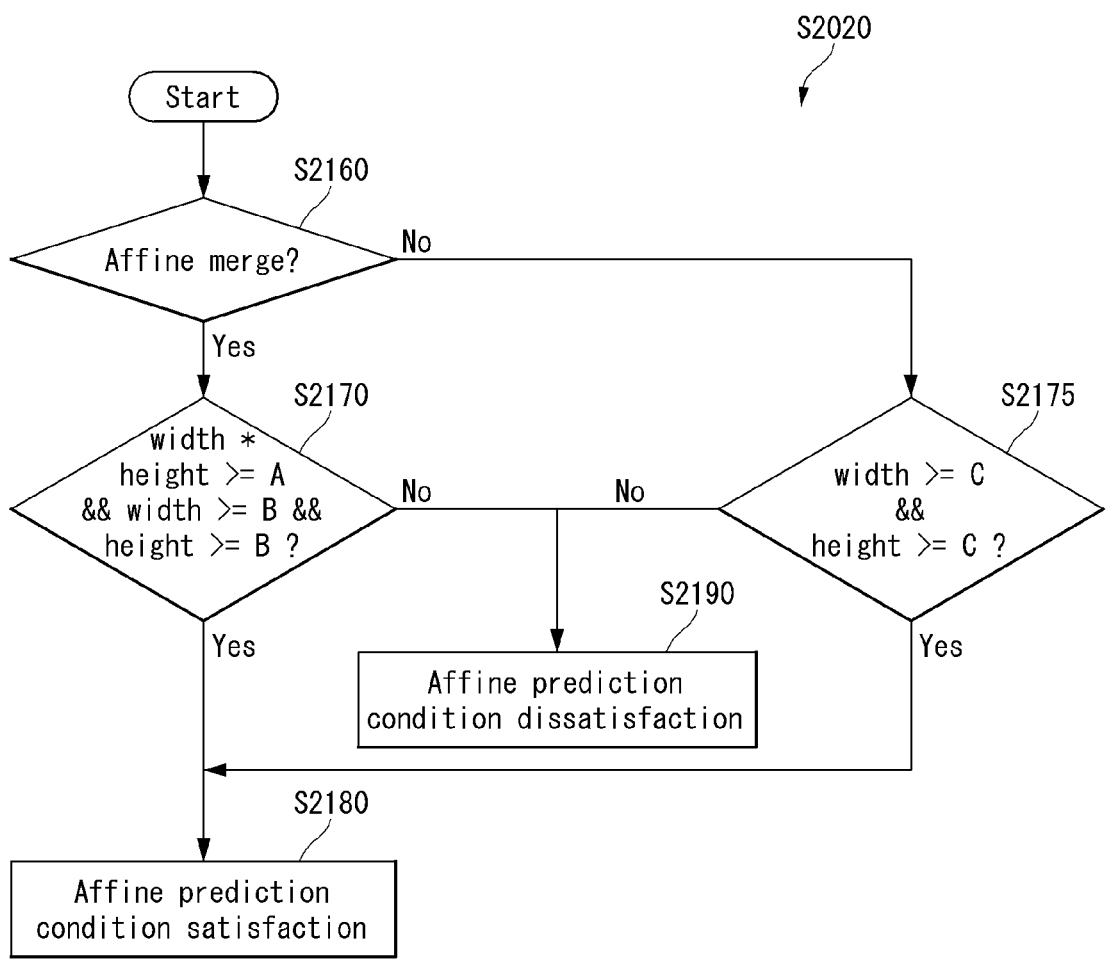

[FIG. 22a]
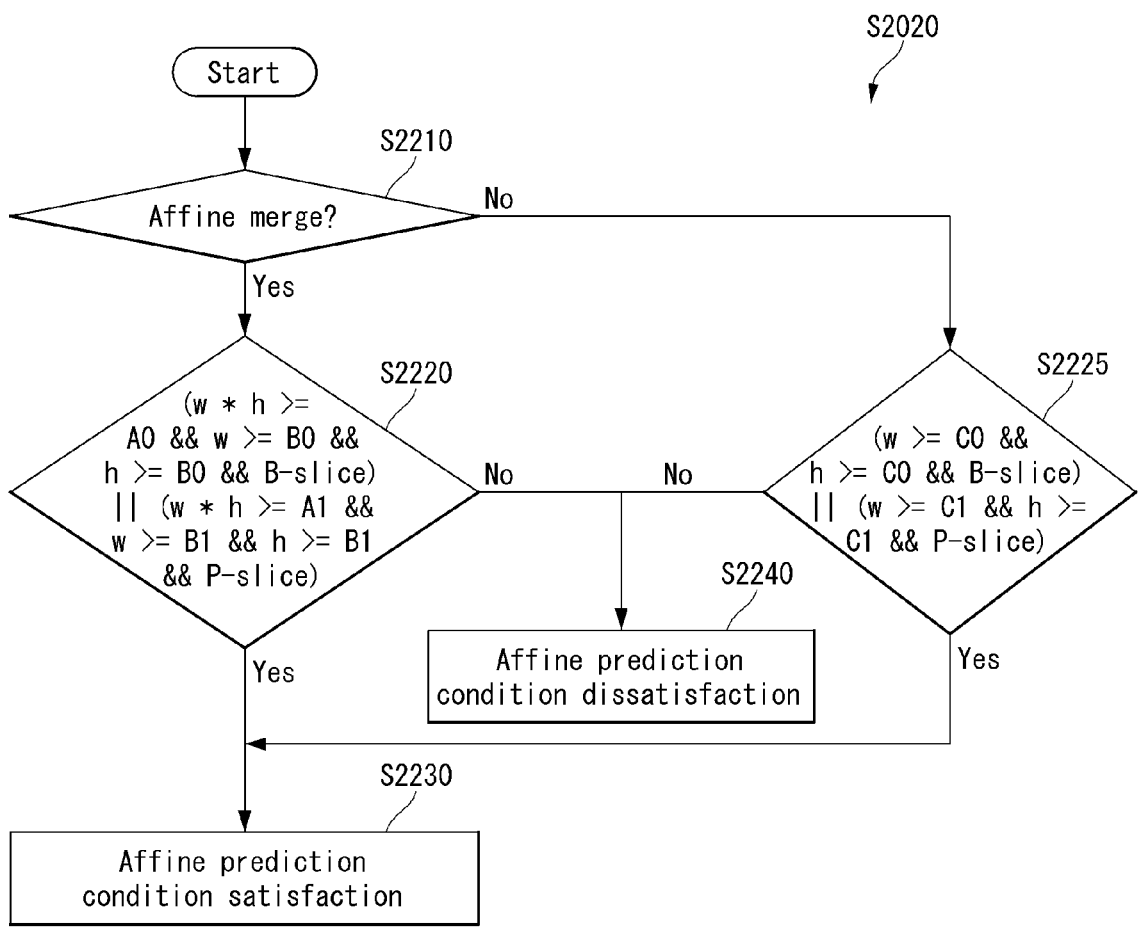

[FIG. 22b]
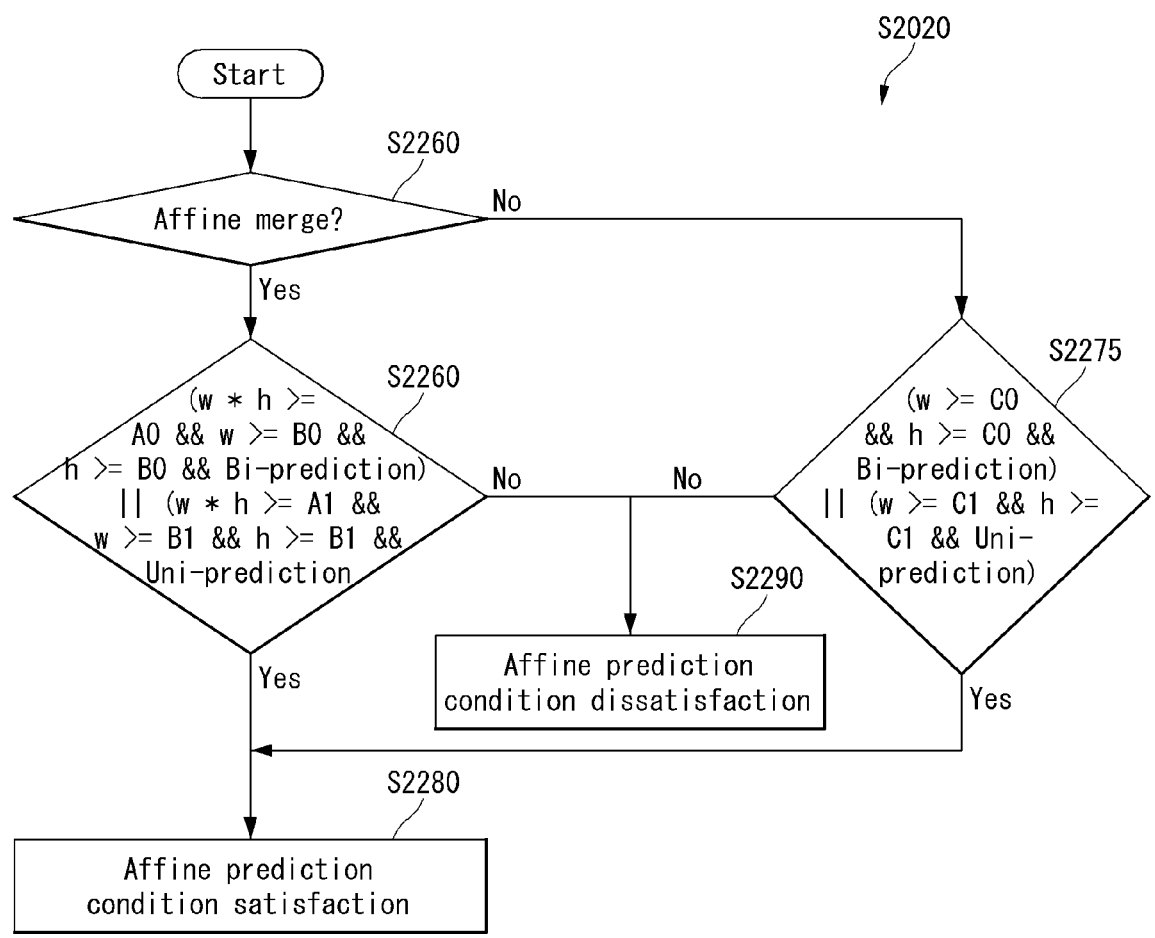

[FIG. 23]
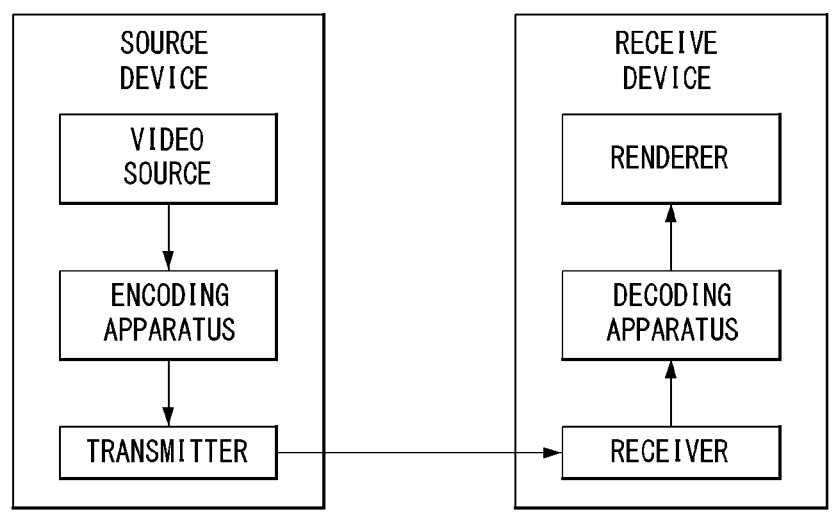

[FIG. 24]
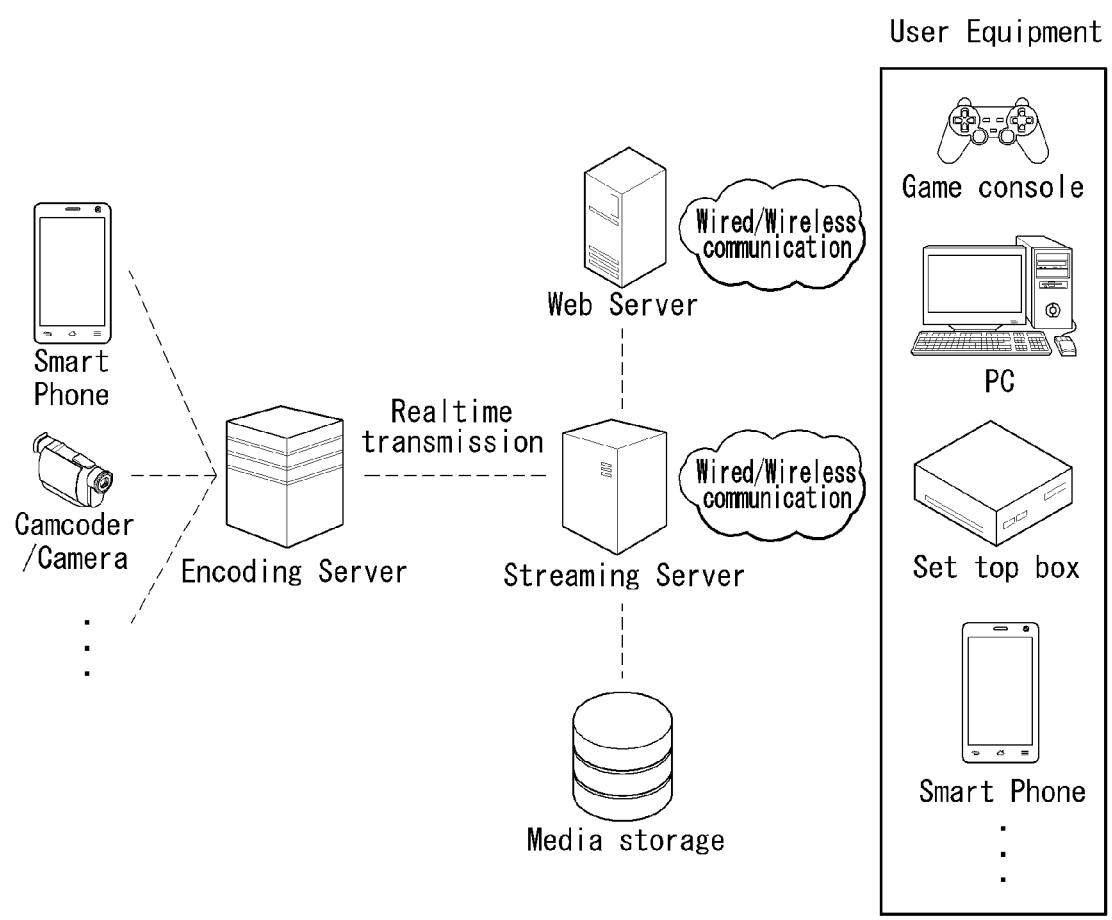

METHOD AND DEVICE FOR PROCESSING VIDEO SIGNAL USING AFFINE MOTION PREDICTION

CROSS-REFERENCE TO RELATED APPLICATIONS

This application is the National Stage filing under 35 U.S.C. 371 of International Application No. PCT/KR2019/007115, filed on Jun. 13, 2019, which claims the benefit of Korean Patent Application No. 10-2018-0069509 filed on Jun. 18, 2018, the contents of which are all hereby incorporated by reference herein in their entirety.

TECHNICAL FIELD

The present disclosure relates to a method and device for processing a video signal using an affine motion prediction, and more particularly to a method and device for processing a video signal by defining a size of a block on which an affine motion prediction is performed.

BACKGROUND ART

A compression encoding means a series of signal processing techniques for transmitting digitized information through a communication line or techniques for storing the information in the form that is suitable for a storage medium. The media including a video, an image, an audio, and the like may be the target for the compression encoding, and particularly, the technique of performing the compression encoding targeted to the video is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, a coding tool for processing more efficiently the next generation video contents needs to be designed. As an inter-frame prediction technique for processing more efficiently the video contents, a method and device for affine motion prediction for representing various motions have been introduced.

DISCLOSURE

Technical Problem

There is a need for a method and device which reduces additional data generated when applying an affine motion prediction and complexity due to calculation.

Accordingly, embodiments of the present disclosure provide a video signal processing method and device for reducing complexity in an affine motion prediction.

Embodiments of the present disclosure also provide a video signal processing method and device capable of omitting calculation of a subblock size by using a pre-defined subblock size in a block on which an affine prediction is performed.

Embodiments of the present disclosure also provide a video signal processing method and device capable of minimizing performance degradation while reducing complexity by determining a subblock size at a slice level or a block level.

Embodiments of the present disclosure also provide a video signal processing method and device capable of reducing complexity of an affine prediction process by setting a minimum block size as affine prediction condition.

Embodiments of the present disclosure also provide a video signal processing method and device capable of minimizing performance degradation while reducing complexity of an affine prediction process by setting condition of a block size at a slice level or a block level.

The technical objects to be achieved by the present disclosure are not limited to those that have been described hereinabove merely by way of example, and other technical objects that are not mentioned can be clearly understood from the following description by those skilled in the art to which the present disclosure pertains.

Technical Solution

In one aspect, there is provided a method for processing a video signal using an affine motion prediction, the method comprising checking that a current block to be decoded is encoded by the affine motion prediction, obtaining motion vectors for a plurality of control points of the current block, determining a motion vector for each of a plurality of subblocks included in the current block based on the motion vectors for the plurality of control points, and generating a prediction sample for the current block from the motion vector for each of the plurality of subblocks, wherein each of the plurality of subblocks is configured to have a pre-defined width and a pre-defined height.

The pre-defined width and the pre-defined height of each of the subblocks may be 4*4 or 8*8. If the current block is a block encoded by bi-prediction, the width and the height of each of the plurality of subblocks may be set to 8*8, and if the current block is a block encoded by uni-prediction, the width and the height of each of the plurality of subblocks may be set to 4*4.

Checking that the current block is encoded by the affine motion prediction may comprise checking a coding mode of the current block, determining whether a width and a height of the current block satisfy a condition according to the coding mode of the current block, and if the condition is satisfied, checking that the affine motion prediction can be performed.

Determining whether the width and the height of the current block satisfy the condition according to the coding mode of the current block may comprise if the coding mode is an affine merge mode, determining that the condition is satisfied when the width of the current block is greater than or equal to a first reference value, and the height of the current block is greater than or equal to the first reference value, and if the coding mode is an affine inter mode, determining that the condition is satisfied when the width of the current block is greater than or equal to a second reference value, and the height of the current block is greater than or equal to the second reference value. The first reference value for the case of the affine merge mode may be 8, and the second reference value for the case of the affine inter mode may be 16.

Determining whether the width and the height of the current block satisfy the condition according to the coding mode of the current block, may comprise, if the coding mode is an affine merge mode, determining that the condition is satisfied when the current block has been encoded by the bi-prediction, a product of the width and the height of the current block is greater than or equal to a third reference value, the width of the current block is greater than or equal to a fourth reference value, and the height of the current block is greater than or equal to the fourth reference value, or determining that the condition is satisfied when the current block has been encoded by the uni-prediction, the product of the width and the height of the current block is greater than or equal to a fifth reference value, the width of the current block is greater than or equal to a sixth reference value, and the height of the current block is greater than or equal to the sixth reference value, wherein the third reference value is greater than or equal to the fifth reference value, and the fifth reference value is greater than or equal to a width or a height of the subblock, wherein the fourth reference value is greater than or equal to the sixth reference value, and the sixth reference value is greater than or equal to the width or the height of the subblock, and if the coding mode is an affine inter mode, determining that the condition is satisfied when the current block has been encoded by the bi-prediction, the width of the current block is greater than or equal to a seventh reference value, and the height of the current block is greater than or equal to the seventh reference value, or determining that the condition is satisfied when the current block has been encoded by the uni-prediction, the width of the current block is greater than or equal to an eighth reference value, and the height of the current block is greater than or equal to the eighth reference value, wherein the seventh reference value is greater than or equal to the width or the height of the subblock, the seventh reference value is greater than or equal to the eighth reference value, and the eighth reference value is greater than or equal to the width or the height of the subblock.

In another aspect, there is provided a device for processing a video signal using an affine motion prediction, the device comprising a memory configured to store the video signal, and a decoder functionally coupled to the memory, wherein the decoder is configured to check that a current block to be decoded is encoded by the affine motion prediction, obtain a motion vector for at least one control point of the current block, determine a motion vector for each of a plurality of subblocks included in the current block based on the motion vector for the at least one control point, and generate a prediction sample for the current block from the motion vector for each of the plurality of subblocks, wherein each of the plurality of subblocks is configured to have a pre-defined width and a pre-defined height.

The pre-defined width and the pre-defined height of each of the subblocks may be 4*4 or 8*8. If the current block is a block encoded by bi-prediction, the width and the height of each of the plurality of subblocks may be set to 8*8, and if the current block is a block encoded by uni-prediction, the width and the height of each of the plurality of subblocks may be set to 4*4.

The decoder may be further configured to check a coding mode of the current block, determine whether a width and a height of the current block satisfy a condition according to the coding mode of the current block, and if the condition is satisfied, check that the affine motion prediction can be performed.

The decoder may be further configured to, if the coding mode is an affine merge mode, determine that the condition is satisfied when the width of the current block is greater than or equal to a first reference value, and the height of the current block is greater than or equal to the first reference value, and if the coding mode is an affine inter mode, determine that the condition is satisfied when the width of the current block is greater than or equal to a second reference value, and the height of the current block is greater than or equal to the second reference value. The first reference value for the case of the affine merge mode may be 8, and the second reference value for the case of the affine inter mode may be 16.

The decoder may be further configured to, if the coding mode is an affine merge mode, determine that the condition is satisfied when the current block has been encoded by the bi-prediction, a product of the width and the height of the current block is greater than or equal to a third reference value, the width of the current block is greater than or equal to a fourth reference value, and the height of the current block is greater than or equal to the fourth reference value, or determine that the condition is satisfied when the current block has been encoded by the uni-prediction, the product of the width and the height of the current block is greater than or equal to a fifth reference value, the width of the current block is greater than or equal to a sixth reference value, and the height of the current block is greater than or equal to the sixth reference value, wherein the third reference value is greater than or equal to the fifth reference value, and the fifth reference value is greater than or equal to a width or a height of the subblock, wherein the fourth reference value is greater than or equal to the sixth reference value, and the sixth reference value is greater than or equal to the width or the height of the subblock, and if the coding mode is an affine inter mode, determine that the condition is satisfied when the current block has been encoded by the bi-prediction, the width of the current block is greater than or equal to an eighth reference value, and the height of the current block is greater than or equal to the seventh reference value, or determine that the condition is satisfied when the current block has been encoded by the uni-prediction, the width of the current block is greater than or equal to an eighth reference value, and the height of the current block is greater than or equal to the eighth reference value, wherein the seventh reference value is greater than or equal to the eighth reference value, and the eighth reference value is greater than or equal to the width or the height of the subblock.

Advantageous Effects

Embodiments of the present disclosure can reduce complexity in affine motion prediction.

Embodiments of the present disclosure can also omit calculation of a subblock size by using a pre-defined subblock size in a block on which an affine prediction is performed.

Embodiments of the present disclosure can also minimize performance degradation while reducing complexity by determining a subblock size at a slice level or a block level.

Embodiments of the present disclosure can also reduce complexity of an affine prediction process by setting a minimum block size as affine prediction condition.

Embodiments of the present disclosure can also minimize performance degradation while reducing complexity of an affine prediction process by setting condition of a block size at a slice level or a block level.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an example of a functional configuration of an encoder as an example of a video signal processing device according to an embodiment of the present disclosure.

FIG. 2 illustrates an example of a functional configuration of a decoder as another example of a video signal processing device according to an embodiment of the present disclosure.

FIG. 3 illustrates an example of a multi-type tree structure according to an embodiment of the present disclosure.

FIG. 4 illustrates an example of a signalling mechanism of partition split information of a quadtree with nested multi-type tree structure according to an embodiment of the present disclosure.

FIG. 5 illustrates an example of a method for splitting a coding tree unit (CTU) into multiple CUs based on a quadtree and nested multi-type tree structure according to an embodiment of the present disclosure.

FIG. 6 illustrates an example of a method for limiting ternary tree split according to an embodiment of the present disclosure.

FIG. 7 illustrates an example of redundant split patterns that may occur in binary tree split and ternary tree split according to an embodiment of the present disclosure.

FIG. 8 illustrates an example of a flowchart of an operation for video encoding in a video signal processing method according to an embodiment of the present disclosure.

FIG. 9 illustrates an example of a functional configuration of an inter-prediction unit of an encoder in a video signal processing device according to an embodiment of the present disclosure.

FIG. 10 illustrates an example of a flowchart of an operation for video decoding in a video signal processing method according to an embodiment of the present disclosure.

FIG. 11 illustrates an example of a functional configuration of an inter-prediction unit of a decoder in a video signal processing device according to an embodiment of the present disclosure.

FIG. 12 illustrates an example of motion models according to an embodiment of the present disclosure.

FIG. 13 illustrates an example of a control point motion vector for affine motion prediction according to an embodiment of the present disclosure.

FIG. 14 illustrates an example of a motion vector per each subblock of a block to which affine motion prediction according to an embodiment of the present disclosure is applied.

FIG. 15 illustrates an example of a neighboring block used for prediction of a current block in an affine inter mode according to an embodiment of the present disclosure.

FIG. 16 illustrates an example of a neighboring block used for prediction of a current block in an affine merge mode according to an embodiment of the present disclosure.

FIG. 17 illustrates an example of a block on which affine motion prediction is performed using a neighboring block to which affine motion prediction according to an embodiment of the present disclosure is applied.

FIG. 18 illustrates an example of a flowchart of an operation for affine motion prediction according to an embodiment of the present disclosure.

FIG. 19 illustrates another example of a flowchart of an operation for affine motion prediction according to an embodiment of the present disclosure.

FIG. 20 illustrates an example of a flowchart of an operation for checking whether affine motion prediction according to an embodiment of the present disclosure is available.

FIGS. 21a and 21b illustrate an example of a flowchart of an operation for checking condition for whether affine motion prediction is available based on a block size according to an embodiment of the present disclosure.

FIGS. 22a and 22b illustrate an example of a flowchart of an operation for checking condition for whether affine motion prediction is available based on a block size according to an embodiment of the present disclosure.

FIG. 23 illustrates an example of a video coding system as an embodiment to which the present disclosure is applied.

FIG. 24 illustrates an example of a video streaming system as an embodiment to which the present disclosure is applied.

MODE FOR INVENTION

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a frame, a block, etc may be properly replaced and interpreted in each coding process.

In the present disclosure, a 'processing unit' refers to a unit on which encoding/decoding process such as prediction, transform and/or quantization is performed. The processing unit may also be interpreted as the meaning including a unit for a luma component and a unit for a chroma component. For example, the processing unit may correspond to a block, a coding unit (CU), a prediction unit (PU) or a transform unit (TU).

The processing unit may also be interpreted as a unit for a luma component or a unit for a chroma component. For example, the processing unit may correspond to a coding tree block (CTB), a coding block (CB), a prediction unit (PU) or a transform block (TB) for the luma component.

Alternatively, the processing unit may correspond to a CTB, a CB, a PU or a TB for the chroma component. The processing unit is not limited thereto and may be interpreted as the meaning including a unit for the luma component and a unit for the chroma component.

In addition, the processing unit is not necessarily limited to a square block and may be configured in a polygonal shape having three or more vertexes.

In the present disclosure, a pixel is commonly called a sample. In addition, using a sample may mean using a pixel value or the like.

FIG. 1 illustrates an example of a functional configuration of an encoder as an example of a video signal processing device according to an embodiment of the present disclosure.

Referring to FIG. 1, an encoder 100 may include an image partitioning unit 110, a subtractor 115, a transform unit 120, a quantization unit 130, a dequantization unit 140, an inverse transform unit 150, an adder 155, a filtering unit 160, a memory 170, an inter-prediction unit 180, an intra-prediction unit 185, and an entropy encoding unit 190. The inter-prediction unit 180 and the intra-prediction unit 185 may be commonly called a prediction unit. In other words, the prediction unit may include the inter-prediction unit 180 and the intra-prediction unit 185. The transform unit 120, the quantization unit 130, the dequantization unit 140, the inverse transform unit 150 may be included in a residual processing unit. The residual processing unit may further include the subtractor 115. In one embodiment, the image partitioning unit 110, the subtractor 115, the transform unit 120, the quantization unit 130, the dequantization unit 140, the inverse transform unit 150, the adder 155, the filtering unit 160, the inter-prediction unit 180, the intra-prediction unit 185, and the entropy encoding unit 190 may be implemented as one hardware component (e.g., an encoder or a processor). Furthermore, the memory 170 may include a decoded picture buffer (DPB) 172 and may be implemented by a digital storage medium.

The image partitioning unit 110 may partition an input image (or picture or frame) input to the encoder 100 into one or more processing units. For example, the processing unit may be called a coding unit (CU). In this case, the coding unit may be recursively split from a coding tree unit (CTU) or a largest coding unit (LCU) based on a quadtree binary tree (QTBT) structure. For example, one coding unit may be partitioned into a plurality of coding units of deeper depth based on a quadtree structure and/or a binary tree structure. In this case, for example, the quadtree structure may be first applied, and the binary tree structure may be then applied. Alternatively the binary tree structure may be first applied. A coding procedure according to the present disclosure may be performed based on a final coding unit that is no longer partitioned. In this case, the largest coding unit may be directly used as the final coding unit based on coding efficiency according to image characteristics, or the coding unit may be recursively split into coding units of deeper depth, if necessary or desired, and thus a coding unit with an optimal size may be used as the final coding unit. Herein, the coding procedure may include a procedure, such as prediction, transform or reconstruction to be described later. As another example, the processing unit may further include a prediction unit (PU) or a transform unit (TU). In this case, each of the prediction unit and the transform unit may be split or partitioned from the final coding unit described above. The prediction unit may be a unit for sample prediction, and the transform unit may be a unit from which a transform coefficient is derived and/or a unit in which a residual signal is derived from a transform coefficient.

A unit may be interchangeably used with terms such as a block or an area, if necessary or desired. In a common case, an M×N block may indicate a set of samples consisting of M columns and N rows or a set of transform coefficients. The sample may generally indicate a pixel or a value of a pixel, and may indicate only a pixel/pixel value of a luma component or only a pixel/pixel value of a chroma component. In the sample, one picture (or image) may be used as a term corresponding to a pixel or pel.

The encoder 100 may subtract a prediction signal (predicted block or prediction sample array) output by the inter-prediction unit 180 or the intra-prediction unit 185 from an input image signal (original block or original sample array) to generate a residual signal (residual block or residual sample array), and the generated residual signal is sent to the transform unit 120. In this case, as illustrated, in the encoder 100, a unit that subtracts the prediction signal (predicted block or prediction sample array) from the input image signal (original block or original sample array) may be called the subtractor 115. The prediction unit may perform prediction for a processing target block (hereinafter referred to as a current block), and may generate a predicted block including prediction samples for the current block. The prediction unit may determine whether intra-prediction or inter-prediction is applied on a per current block or CU basis. The prediction unit may generate a variety of information on prediction, such as prediction mode information as will be described later in the description of each prediction mode, and may transmit the variety of information to the entropy encoding unit 190. The information on the prediction may be encoded by the entropy encoding unit 190 and may be output in the form of bitstream.

The intra-prediction unit 185 may predict the current block with reference to samples in a current picture. The referred samples may be positioned in the neighborhood of the current block or positioned apart from the current block according to the prediction mode. In the intra prediction, the prediction modes may include a plurality of non-directional modes and a plurality of directional modes. The non-directional mode may include, for example, a DC mode and a planar mode. The directional mode may include, for example, 33 directional prediction modes or 65 directional prediction modes according to a minuteness degree of the prediction direction. However, this is merely an example and directional prediction modes of a number equal thereto or more therethan or equal thereto or less therethan may be used according to a configuration. The intra-prediction unit 185 may determine the prediction mode applied to the current block by using the prediction mode applied to the neighboring block.

The inter-prediction unit 180 may derive a prediction block for the current block based on a reference block (reference sample array) specified by a motion vector on the reference picture. In this case, in order to reduce an amount of motion information transmitted in the inter-prediction mode, the motion information may be predicted in units of a block, a subblock, or a sample based on a correlation of the motion information between the neighboring block and the current block. The motion information may include a motion vector and a reference picture index. The motion information may further include inter-prediction direction (L0 prediction, L1 prediction, Bi prediction, etc.) information. In the case of the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, the inter-prediction unit 180 may configure a motion information candidate list based on the neighboring blocks and generate information indicating which candidate is used in order to derive the motion vector and/or the reference picture index of the current block. The inter prediction may be performed based on various prediction modes and for example, in the case of a skip mode and a merge mode, the inter-prediction unit 180 may use the motion information of the neighboring block as the motion information of the current block. In the case of the skip mode, the residual signal may not be transmitted unlike the merge mode. In the case of a motion vector prediction (MVP) mode, the motion vector of the neighboring block is used as a motion vector predictor and a motion vector difference is signaled to indicate the motion vector of the current block. A method and a device for the inter-prediction are described in detail with reference to FIGS. 8 to 11. A prediction signal generated through the inter-prediction unit 180 or the intra-prediction unit 185 may be used to generate a reconstructed signal or to generate a residual signal.

The transform unit 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). The GBT means a transform obtained from a graph if relation information between pixels is represented by the graph. The CNT means a transform obtained based on a prediction signal generated using all previously reconstructed pixels. Furthermore, a transform process may be applied to pixel blocks with the same size in a square shape, or may be applied to blocks with variable sizes in a non-square shape.

The quantization unit 130 may quantize transform coefficients and transmit them to the entropy encoding unit 190. The entropy encoding unit 190 may encode a quantized signal (information on quantized transform coefficients) and output it in the form of bitstream. The information on the quantized transform coefficients may be called residual information. The quantization unit 130 may rearrange the quantized transform coefficients of a block form in one-dimensional vector form based on various scan orders, and may generate information on the quantized transform coefficients based on the quantized transform coefficients of the one-dimensional vector form. The entropy encoding unit 190 may perform various encoding methods, for example, exponential Golomb, context-adaptive variable length coding (CAVLC), and context-adaptive binary arithmetic coding (CABAC). The entropy encoding unit 190 may encode together or separately information (e.g., values of syntax elements) necessary for video/image reconstruction, in addition to the quantized transform coefficients. The encoded information (e.g., encoded video/image information) may be transmitted or stored on a per network abstraction layer (NAL) unit basis in the form of bitstream. The bitstream may be transmitted over a network, or may be stored in a digital storage medium. The network may include a broadcast network and/or a communication network. The digital storage medium may include various storage media, such as a universal serial bus (USB), a secure digital (SD) card, a compact disk (CD), a digital video disk (DVD), Blueray, a hard disk drive (HDD), a solid state drive (SSD), and a flash memory. A communication unit (not shown) and/or a storage unit (not shown) or a memory (not shown) for a signal output by the entropy encoding unit 190 may be internal/external components of the encoder 100, or a transmitter may be a component of the entropy encoding unit 190.

The quantized transform coefficients output from the quantization unit 130 may be used to generate the prediction signal. For example, dequantization and inverse transform may be applied to the quantized transform coefficients by the dequantization unit 140 and the inverse transform unit 150 in a loop to reconstruct the residual signal. The adder 155 adds the reconstructed residual signal to the prediction signal output from the inter-prediction unit 180 or the intra-prediction unit 185 to generate a reconstructed signal (a reconstructed picture, a reconstructed block, or a reconstructed sample array). Like the case of applying the skip mode, when there is no residual for the processing target block, the prediction block may be used as the reconstructed block. The adder 155 may be referred to as a reconstruction unit or a reconstructed block generation unit. The generated reconstructed signal may be used for intra prediction of a next processing target block in the current picture and may be used for inter prediction of a next picture through filtering as described below.

The filtering unit 160 can improve subjective/objective picture quality by applying filtering to a reconstructed signal. For example, the filtering unit 160 may apply various filtering methods to a reconstructed picture to generate a modified reconstructed picture, and the modified reconstructed picture may be stored in the memory 170, more particularly in the DPB 172 of the memory 170. Examples of the various filtering methods may include deblocking filtering, a sample adaptive offset (SAO), an adaptive loop filter (ALF), and a bilateral filter. The filtering unit 160 may generate a variety of information about filtering as will be described later in the description of each filtering method, and may transmit it to the entropy encoding unit 190. The information about filtering may be encoded by the entropy encoding unit 190 and output in the form of bitstream.

The modified reconstructed picture stored in the memory 170 may be used as a reference picture in the inter-prediction unit 180. Hence, when inter-prediction is applied, the encoder 100 can avoid a prediction mismatch in the encoder 100 and a decoder 200 and improve coding efficiency.

The DPB 172 of the memory 170 may store the modified reconstructed picture so as to use it as a reference picture in the inter-prediction unit 180. The memory 170 may store motion information of a block in which motion information in the current picture is derived (or encoded) and/or motion information of blocks in an already reconstructed picture. The stored motion information may be sent to the inter-prediction unit 180 to be utilized as motion information of a spatial neighboring block or motion information of a temporal neighboring block. The memory 170 may store reconstructed samples of the reconstructed blocks in the current picture and send them to the intra-prediction unit 185.

FIG. 2 illustrates an example of a functional configuration of a decoder as another example of a video signal processing device according to an embodiment of the present disclosure.

Referring to FIG. 2, the decoder 200 may include an entropy decoding unit 210, a dequantization unit 220, an inverse transform unit 230, an adder 235, a filtering unit 240, a memory 250, an inter-prediction unit 260, and an intra-prediction unit 265. The inter-prediction unit 260 and the intra-prediction unit 265 may be combined and called a prediction unit. That is, the prediction unit may include the inter-prediction unit 260 and the intra-prediction unit 265. The dequantization unit 220 and the inverse transform unit 230 may be combined and called a residual processing unit. That is, the residual processing unit may include the dequantization unit 220 and the inverse transform unit 230. In some embodiments, the entropy decoding unit 210, the dequantization unit 220, the inverse transform unit 230, the adder 235, the filtering unit 240, the inter-prediction unit 260, and the intra-prediction unit 265 may be implemented as one hardware component (e.g., a decoder or a processor). Further, the memory 250 may include a DPB 252 and may be implemented by a digital storage medium.

If a bitstream including video/image information is input, the decoder 200 may reconstruct an image according to a process of processing video/image information in the encoder 100 of FIG. 1. For example, the decoder 200 may perform decoding using the processing unit applied in the encoder 100. Thus, a processing unit for decoding may be, for example, a coding unit, and the coding unit may be split from a coding tree unit or a largest coding unit depending on a quadtree structure and/or a binary-tree structure. Further, a reconstructed image signal decoded and output by the decoder 200 may be reproduced through a playback device.

The decoder 200 may receive a signal output by the encoder 100 of FIG. 1 in the form of bitstream, and the received signal may be decoded through the entropy decoding unit 210. For example, the entropy decoding unit 210 may parse the bitstream to derive information (e.g., video/image information) necessary for image reconstruction (or picture reconstruction). For example, the entropy decoding unit 210 may decode information within the bitstream based on a coding method such as exponential Golomb coding, CAVLC or CABAC, and may output a value of a syntax element necessary for image reconstruction or quantized values of transform coefficients about a residual. More specifically, a CABAC entropy decoding method may receive a bin corresponding to each syntax element from a bitstream, determine a context model using decoding target syntax element information and decoding information of a neighboring and decoding target block or information of a symbol/bin decoded in a previous step, predict a probability of occurrence of the bin based on the determined context model, and perform arithmetic decoding of the bin to thereby generate a symbol corresponding to a value of each syntax element. In this instance, the CABAC entropy decoding method may determine a context model, and then update the context model using information of a symbol/bin decoded for a context model of a next symbol/bin. Information related to a prediction among information decoded in the entropy decoding unit 210 may be provided to the prediction unit (the inter-prediction unit 260 or the intra-prediction unit 265). A residual value, i.e., quantized transform coefficients and related parameter information, on which entropy decoding is performed in the entropy decoding unit 210, may be input to the dequantization unit 220. Further, information related to filtering among information decoded in the entropy decoding unit 210 may be provided to the filtering unit 240. A receiver (not shown) receiving a signal output from the encoder 100 may be further configured as an internal/external element of the decoder 200, or the receiver may be a component of the entropy decoding unit 210.

The dequantization unit 220 may dequantize the quantized transform coefficients and output transform coefficients. The dequantization unit 220 may rearrange the quantized transform coefficients in a two-dimensional block form. In this case, the rearrangement may be performed based on the scan order performed in the encoder 100. The dequantization unit 220 may perform dequantization on the quantized transform coefficients using a quantization parameter (e.g., quantization step size information), and may obtain transform coefficients.

The inverse transform unit 230 may obtain a residual signal (residual block or residual sample array) by inversely transforming the transform coefficients.

The prediction unit may perform prediction for a current block and generate a predicted block including prediction samples for the current block. The prediction unit may determine whether the intra prediction or the inter prediction is applied to the current block based on the information on the prediction output from the entropy decoding unit 210 and determine a specific intra/inter-prediction mode.

The intra-prediction unit 265 may predict the current block by referring to samples in the current picture. The referred samples may be positioned in the neighborhood of the current block or positioned apart from the current block according to the prediction mode. In the intra prediction, the prediction modes may include a plurality of non-directional modes and a plurality of directional modes. The intra-prediction unit 265 may determine the prediction mode applied to the current block by using the prediction mode applied to the neighboring block.

The inter-prediction unit 260 may derive a predicted block for a current block based on a reference block (reference sample array) that is specified by a motion vector on a reference picture. In this instance, in order to reduce an amount of motion information transmitted in an inter-prediction mode, motion information may be predicted on a per block, subblock or sample basis based on a correlation of motion information between a neighboring block and the current block. The motion information may include a motion vector and a reference picture index. The motion information may further include inter-prediction direction (L0 prediction, L1 prediction, Bi prediction, etc.) information. In the case of inter-prediction, the neighboring block may include a spatial neighboring block present in a current picture and a temporal neighboring block present in a reference picture. For example, the inter-prediction unit 260 may construct a motion information candidate list based on neighboring blocks, and may derive a motion vector and/or reference picture index of the current block based on received candidate selection information. The inter-prediction may be performed based on various prediction modes. Information related to the prediction may include information indicating a mode of inter-prediction for the current block.

The adder 235 adds the obtained residual signal to a predicted signal (a prediction block or a predicted sample array) output from the inter-prediction unit 260 or the intra-prediction unit 265 to generate a reconstructed signal (a reconstructed picture, a reconstructed block, or a reconstructed sample array). Like the case of applying the skip mode, when there is no residual for the processing target block, the prediction block may be used as the reconstructed block.

The adder 235 may be referred to as a reconstruction unit or a reconstructed block generation unit. The generated reconstructed signal may be used for intra prediction of a next processing target block in the current picture and used for inter prediction of a next picture through a filtering as described below.

The filtering unit 240 can improve subjective/objective picture quality by applying filtering to a reconstructed signal. For example, the filtering unit 240 may apply various filtering methods to a reconstructed picture to generate a modified reconstructed picture, and may send the modified reconstructed picture to the memory 250, more particularly the DPB 252 of the memory 250. Examples of the various filtering methods may include deblocking filtering, a sample adaptive offset (SAO), an adaptive loop filter (ALF), and a bilateral filter.

The (modified) reconstructed picture stored in the DPB 252 of the memory 250 may be used as a reference picture in the inter-prediction unit 260. The memory 250 may store motion information of a block in which motion information in the current picture is derived (or decoded) and/or motion information of blocks in an already reconstructed picture. The stored motion information may be sent to the inter-prediction unit 260 in order to be utilized as motion information of a spatial neighboring block or motion information of a temporal neighboring block. The memory 250 may store reconstructed samples of the reconstructed blocks in the current picture and send them to the intra-prediction unit 265.

In the present disclosure, embodiments described in the filtering unit 160, the inter-prediction unit 180, and the intra-prediction unit 185 of the encoder 100 may be equally or correspondingly applied to the filtering unit 240, the inter-prediction unit 260, and the intra-prediction unit 265 of the decoder 200, respectively.

Block Partitioning

A video/image coding method according to the present disclosure may be performed based on various detailed techniques, and each detailed technique is schematically described as below. It is apparent to those skilled in the art that the techniques described herein can be associated with related procedures, such as prediction, residual processing ((inverse) transform, (de)quantization, etc.), syntax element coding, filtering, and partitioning/splitting, in a video/image encoding/decoding procedure described above and/or described below.

A block partitioning procedure according to the present disclosure may be performed in the image partitioning unit 110 of the above-described encoder 100, and partitioning related information may be (encoding) processed in the entropy encoding unit 190 and sent to the decoder 200 in the form of bitstream. The entropy decoding unit 210 of the decoder 200 may derive a block partitioning structure of a current picture based on the partitioning related information obtained from the bitstream, and may perform a series of procedures (e.g., prediction, residual processing, block reconstruction, in-loop filtering, etc.) for image decoding based on this.

Partitioning of Picture into CTUs

Respective pictures of a video signal may be partitioned into a sequence of coding tree units (CTUs). The CTU may correspond to a coding tree block (CTB). Alternatively, the CTU may include a coding tree block of luma samples and two coding tree blocks of corresponding chroma samples. In other words, for a picture including three sample arrays, the CTU may include an N×N block of luma samples and two corresponding blocks of chroma samples.

A maximum supported size of a CTU for coding and prediction may be different from a maximum supported size of a CTU for transform. For example, a maximum supported size of luma block in a CTU may be 128×128.

Partitioning of the CTUs Using a Tree Structure

The CTU may be split into CUs based on a quadtree (QT) structure. The quadtree structure may be referred to as a quaternary tree structure. This is to reflect various local characteristics. In the present disclosure, the CTU may be split based on multi-type tree structure splitting including binary tree (BT) and ternary tree (TT) in addition to quadtree. Hereinafter, a QTBT structure may include quadtree and binary-tree based splitting structures and QTBTTT may include quadtree, binary-tree, and ternary-tree based splitting structures. Alternatively, the QTBT structure may include the quadtree, binary-tree, and ternary-tree based partitioning structures. In the coding tree structure, the CU may have a square or rectangular shape. The CTU may be first split into the quadtree structure. Thereafter, leaf nodes of the quadtree structure may be additionally split by a multi-type tree structure.

FIG. 3 illustrates an example of a multi-type tree structure according to an embodiment of the present disclosure.

In an embodiment of the present disclosure, a multi-type tree structure may include four split types as illustrated in FIG. 3. The four split types may include a vertical binary splitting (SPLIT_BT_VER), a horizontal binary splitting (SPLIT_BT_HOR), a vertical ternary splitting (SPLIT_TT_VER), and a horizontal ternary splitting (SPLIT_TT_HOR). Leaf nodes of the multi-type tree structure may be called as CUs. These CUs may be used for a prediction and transform procedure. In the present disclosure, a CU, a PU and a TU may generally have the same block size. However, if a maximum supported transform length is smaller than a width or a height of a color component of the CU, the CU and the TU may have different block sizes.

FIG. 4 illustrates an example of a signalling mechanism of partition split information of a quadtree with nested multi-type tree structure according to an embodiment of the present disclosure.

Here, the CTU is treated as a root of the quadtree and first partitioned into the quadtree structure. Thereafter, each quadtree leaf node may be further partitioned into the multi-type tree structure. In the multi-type tree structure, a first flag (e.g., mtt_split_cu_flag) is signaled to indicate whether a corresponding node is additionally partitioned. When the corresponding node is additionally partitioned, a second flag (e.g., mtt_split_cu_verticla_flag) may be signaled to indicate a splitting direction. Thereafter, a third flag (e.g., mtt_split_cu_binary_flag) may be signaled to indicate whether a splitting type is binary splitting or ternary splitting. For example, based on the mtt_split_cu_vertical_flag and the mtt_split_cu_binary_flag, a multi-type tree splitting mode MttSplitMode of the CU may be derived as shown in Table 1 below.

TABLE 1

| MttSplitMode | mtt_split_cu_vertical_flag | mtt_split_cu_binary_flag |
| --- | --- | --- |
| SPLIT_TT_HOR | 0 | 0 |
| SPLIT_BT_HOR | 0 | 1 |

TABLE 1-continued

| MttSplitMode | mtt_split_cu_vertical_flag | mtt_split_cu_binary_flag |
|---|---|---|
| SPLIT_TT_VER | 1 | 0 |
| SPLIT_BT_VER | 1 | 1 |

FIG. 5 illustrates an example of a method for splitting a coding tree unit (CTU) into multiple CUs based on a quadtree and nested multi-type tree structure according to an embodiment of the present disclosure.

Here, bold block edges indicate quadtree partitioning and the remaining edges indicate multi-type tree partitioning. The quadtree partitioning accompanying the multi-type tree may provide a content-adapted coding tree structure. The CU may correspond to a coding block (CB). Alternatively, the CU may include a coding block of the luma samples and two coding blocks of the corresponding chroma samples. The size of the CU may be as large as the CTU or may be as small as 4×4 in units of the luma sample. For example, in the case of a 4:2:0 color format (or chroma format), a maximum chroma CB size may be 64×64 and a minimum chroma CB size may be 2×2.

In the present disclosure, for example, a maximum supported luma TB size may be 64×64 and a maximum supported chroma TB size may be 32×32. When the width or height of the CB split according to the tree structure is larger than a maximum transform width or height, the corresponding CB may be automatically (or implicitly) split until horizontal and vertical TB size limitations are satisfied.

For a quadtree coding tree scheme accompanying the multi-type tree, the following parameters may be defined and identified as an SPS syntax element.

CTU size: the root node size of a quaternary tree
MinQTSize: the minimum allowed quaternary tree leaf node size
MaxBtSize: the maximum allowed binary tree root node size
MaxTtSize: the maximum allowed ternary tree root node size
MaxMttDepth: the maximum allowed hierarchy depth of multi-type tree splitting from a quadtree leaf
MinBtSize: the minimum allowed binary tree leaf node size
MinTtSize: the minimum allowed ternary tree leaf node size As an example of the quadtree coding tree structure accompanying the multi-type tree, the CTU size may be configured as 128×128 luma samples and 64×64 blocks of two corresponding chroma samples (in the 4:2:0 chroma format). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. The quadtree partitioning may be applied to the CTU and may generate the quadtree leaf nodes. The quadtree leaf node may be referred to as a leaf QT node. The quadtree leaf nodes may have a 128×128 size (i.e., the CTU SIZE) from a 16×16 size (i.e., the MinOTSize). When the leaf QT node is 128×128, the leaf QT node may not be split into the binary tree/ternary tree. The reason is that in this case, even though the leaf QT node is split, the size of the leaf QT node exceeds MaxBtsize and MaxTtszie (i.e., 64×64). In other cases, the leaf QT node may be additionally split into the multi-type tree. Therefore, the leaf QT node may be a root node for the multi-type tree and the leaf QT node may have a multi-type tree depth (mttDepth) value of 0. When the multi-type tree depth reaches MaxMttdepth (e.g., 4), additional splitting may not be considered any longer. When the width of the multi-type tree node is equal to MinBtSize and equal to or smaller than 2×MinTtSize, additional horizontal splitting may not be considered any longer. When the height of the multi-type tree node is equal to MinBtSize and equal to or smaller than 2×MinTtSize, additional vertical splitting may not be considered any longer.

FIG. 6 illustrates an example of a method for limiting ternary tree split according to an embodiment of the present disclosure.

Referring to FIG. 6, in order to allow 64×64 luma block and 32×32 chroma pipeline design in a hardware decoder, a ternary tree (TT) split may be limited in a specific case. For example, if a width or a height of a luma coding block is greater than a predetermined specific value (e.g., 32, 64), the TT split may be limited as illustrated in FIG. 6.

In the present disclosure, a coding tree scheme may support that luma and chroma blocks have a separate block tree structure. For P and B slices, luma and chroma CTBs in a single CTU may be limited to have the same coding tree structure. However, for I slices, luma and chroma blocks may have a separate block tree structure. If a separate block tree mode is applied, a luma CTB may be split into CUs based on a specific coding tree structure, and a chroma CTB may be split into chroma CUs based on a different coding tree structure. This may mean that a CU in the I slice may consist of a coding block of luma component or coding blocks of two chroma components, and a CU in the P or B slice may consist of blocks of three color components.

In the "Partitioning of CTUs using a tree structure" described above, the quadtree coding tree structure with nested multi-type tree has been described, but a structure in which a CU is partitioned is not limited thereto. For example, BT structure and TT structure may be interpreted as the concept included in a multiple partitioning tree (MPT) structure, and it may be interpreted that a CU is partitioned through QT structure and MPT structure. In an example where a CU is partitioned through the QT structure and the MPT structure, a syntax element (e.g., MPT_split_type) including information about how many blocks a leaf node of the QT structure is split, and a syntax element (e.g., MPT_split_mode) including information about whether a leaf node of the QT structure is split in a vertical direction or a horizontal direction may be signaled, and thus a partitioning structure may be determined.

In another example, a CU may be partitioned in a different method from QT structure, BT structure or TT structure. That is, unlike that a CU of deeper depth is partitioned to ¼ size of a CU of upper depth according to the QT structure, or a CU of deeper depth is partitioned to ½ size of a CU of upper depth according to the BT structure, or a CU of deeper depth is partitioned to ¼ size or ½ size of a CU of upper depth according to the TT structure, a CU of deeper depth may be partitioned to ⅕, ⅓, ⅜, ⅗, ⅔ or ⅝ size of a CU of upper depth if necessary or desired, but a method of partitioning a CU is not limited thereto.

The quadtree coding block structure with nested multi-type tree described above can provide a very flexible block partitioning structure. Owing to split types supported in the multi-type tree, different split patterns can potentially bring a result of the same coding block structure in some cases. By limiting generations of such redundant split patterns, a data amount of partitioning information can be reduced. This is described with reference to the figures below.

FIG. 7 illustrates an example of redundant split patterns that may occur in binary tree split and ternary tree split according to an embodiment of the present disclosure.

As illustrated in FIG. 7, two levels of consecutive binary splits in one direction have the same coding block structure as binary splitting for a center partition after the ternary splitting. In such a case, binary tree splitting (in the given direction) for the center partition of the ternary tree splitting may be limited. The limitation may be applied to CUs of all pictures. When specific splitting is limited, signaling of syntax elements may be modified by reflecting such a limitation case and the number of bits signaled for partitioning may be reduced through the modified signaling. For example, like the example illustrated in FIG. 7, when the binary tree splitting for the center partition of the CU is limited, a syntax element mtt_split_cu_binary_flag indicating whether the splitting is the binary splitting or the ternary splitting may not be signaled and the value may be inferred as 0 by the decoder.

Prediction

In order to reconstruct a current processing unit in which decoding is performed, decoded parts of a current picture or other pictures including the current processing unit may be used.

A picture using only the current picture for reconstruction, i.e., performing the intra prediction may be referred to as an intra picture or an I picture (slice), a picture (slice) using up to one motion vector and reference index in order to predict each unit may be referred to as a predictive picture or P picture (slice), and a picture (slice) using up to two motion vectors and reference indexes may be referred to as a bi-predictive picture or B picture (slice).

The intra prediction means a prediction method that derives a current processing block from a data element (e.g., a sample value, etc.) of the same decoded picture (or slice). In other words, the intra prediction means a method for predicting a pixel value of the current processing block by referring to reconstructed areas in the current picture.

Hereinafter, the inter prediction will be described in more detail.

Inter Prediction (or Inter-Picture Prediction)

The inter prediction means a prediction method of deriving the current processing block based on data elements (e.g., the sample value or motion vector) of pictures other than the current picture. In other words, the intra prediction means a method for predicting a pixel value of the current processing block by referring to reconstructed areas in other reconstructed pictures other than the current picture.

The inter prediction (inter-picture prediction) as a technique for eliminating redundancy existing between pictures is mostly performed by motion estimation and motion compensation.

The present disclosure describes the detailed technique of the inter-prediction method described above. Specifically, the present disclosure may represent the content of the decoder using an inter-prediction based video/image decoding method of FIG. 10 and an inter-prediction unit within the decoder 200 of FIG. 11 which will be described later, and may represent the content of the encoder using an inter-prediction based video/image encoding method of FIG. 8 and an inter-prediction unit within the encoder 100 of FIG. 9 which will be described later. In addition, encoded data as illustrated in FIGS. 10 and 11 may be stored in the form of bitstream.

The prediction unit of the encoder 100/the decoder 200 may perform inter-prediction on a per block basis to derive a prediction sample. The inter prediction may represent prediction derived by a method that is dependent on data elements (e.g., sample values or motion information, etc.) of picture(s) other than a current picture. When the inter prediction is applied to a current block, a predicted block (prediction sample array) for the current block may be derived based on a reference block (reference sample array) specified by a motion vector on a reference picture indicated by a reference picture index.

In this case, in order to reduce an amount of motion information transmitted in an inter prediction mode, motion information of the current block may be predicted on a per block, subblock, or sample basis based on a correlation of motion information between the neighboring block and the current block. The motion information may include a motion vector and a reference picture index. The motion information may further include inter-prediction type (L0 prediction, L1 prediction, Bi prediction, etc.) information.

If the inter prediction is applied, a neighboring block may include a spatial neighboring block which is present in the current picture, and a temporal neighboring block which is present in the reference picture. A reference picture including the reference block and a reference picture including the temporal neighboring block may be the same as or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list (or inherited candidate list) may be constructed based on the neighboring blocks of the current block, and a flag or index information indicating which candidate is selected (used) may be signaled in order to derive the motion vector and/or reference picture index of the current block.

The inter prediction may be performed based on various prediction modes. For example, in a skip mode and a merge mode, motion information of the current block may be the same as motion information of a selected neighboring block. In the skip mode, a residual signal may not be transmitted unlike the merge mode. In a motion vector prediction (MVP) mode, a motion vector of the selected neighboring block may be used as a motion vector predictor, and a motion vector difference value may be signaled. In this case, a motion vector of the current block may be derived using a sum of the motion vector predictor and the motion vector difference.

FIGS. 8 and 9 illustrate an inter prediction based video/image encoding method according to an embodiment of the present disclosure and an inter-prediction unit in an encoder 100 according to an embodiment of the present disclosure.

Referring to FIGS. 8 and 9, a step S810 may be performed by the inter-prediction unit 180 of the encoder 100, and a step S820 may be performed by the residual processing unit of the encoder 100. Specifically, the step S820 may be performed by the subtractor 115 of the encoder 100. In a step S830, prediction information may be derived by the inter-prediction unit 180 and encoded by the entropy encoding unit 190. In the step S830, residual information may be derived by the residual processing unit and encoded by the entropy encoding unit 190. The residual information is information on residual samples. The residual information may include information on quantized transform coefficients for the residual samples.

As described above, the residual samples may be transformed into transform coefficients by the transform unit 120 of the encoder 100, and the transform coefficients may be derived as quantized transform coefficients by the quantization unit 130. Information on the quantized transform coefficients may be encoded through a residual coding procedure by the entropy encoding unit 190.

The encoder 100 performs inter prediction on a current block in S810. The encoder 100 may derive an inter prediction mode and motion information of the current block and generate prediction samples of the current block. Herein, an inter prediction mode determining procedure, a motion information deriving procedure, and a procedure of generating the prediction samples may be simultaneously performed, and any one procedure may be performed earlier than other procedures. For example, the inter-prediction unit 180 of the encoder 100 may include a prediction mode determining unit 181, a motion information deriving unit 182, and a prediction sample deriving unit 183. The prediction mode determining unit 181 may determine a prediction mode for the current block, and the motion information deriving unit 182 may derive the motion information of the current block. The prediction sample deriving unit 183 may derive motion samples of the current block.

For example, the inter-prediction unit 180 of the encoder 100 may search a block similar to the current block in a predetermined area (search area) of reference pictures through motion estimation, and derive a reference block in which a difference from the current block is minimum or is equal to or less than a predetermined criterion. Based on this, a reference picture index indicating a reference picture at which the reference block is positioned may be derived, and a motion vector may be derived based on a difference in location between the reference block and the current block. The encoder 100 may determine a mode applied to the current block among various prediction modes. The encoder 100 may compare rate-distortion (RD) cost for the various prediction modes and determine an optimal prediction mode for the current block.

For example, when a skip mode or a merge mode is applied to the current block, the encoder 100 may construct a merge candidate list to be described below and derive a reference block in which a difference from the current block is minimum among reference blocks indicated by merge candidates included in the merge candidate list or is equal to or less than a predetermined criterion. In this case, a merge candidate associated with the derived reference block may be selected, and merge index information indicating the selected merge candidate may be generated and signaled to the decoder 200. Motion information of the current block may be derived from motion information of the selected merge candidate.

As another example, when an (A)MVP mode is applied to the current block, the encoder 100 may construct an (A)MVP candidate list to be described below and use a motion vector of a selected motion vector predictor (MVP) candidate among MVP candidates included in the (A)MVP candidate list, as an MVP of the current block. In this case, for example, the motion vector indicating the reference block derived by the motion estimation may be used as the motion vector of the current block, and an MVP candidate having a motion vector with a smallest difference from the motion vector of the current block among the MVP candidates may be selected as the MVP candidate. A motion vector difference (MVD) which is a difference obtained by subtracting the MVP from the motion vector of the current block may be derived. In this case, information on the MVD may be signaled to the decoder 200. Further, when the (A)MVP mode is applied, a value of the reference picture index may be included in reference picture index information. The reference picture index information including the reference picture index value may be separately signaled to the decoder 200.

The encoder 100 may derive the residual samples based on the prediction samples in S820. The encoder 100 may derive the residual samples by comparing original samples of the current block with the prediction samples. The prediction information is information related to the prediction procedure, and may include, for example, prediction mode information (e.g., skip flag, merge flag, or mode index) and information on motion. The information on motion may include candidate selection information (e.g., merge index, mvp flag or mvp index) which is information for deriving the motion vector. Further, the information on motion may include the information on the MVD and/or the reference picture index information.

Further, the information on motion may include information representing whether to apply L0 prediction, L1 prediction, or bi-prediction. The residual information may include information on the residual samples. The residual information may include information on quantized transform coefficients for the residual samples.

An output bitstream may be stored in a (digital) storage medium, or directly sent to the decoder 200, or sent to the decoder 200 via the network.

As described above, the encoder 100 may generate a reconstructed picture (including reconstructed samples and reconstructed blocks) based on the reference samples and the residual samples. The generation of the reconstructed picture by the encoder 100 is to derive the same prediction result as that performed by the decoder 200 from the encoder 100. As a result, coding efficiency can be increased through the generation of the reconstructed picture in the encoder 100. Thus, the encoder 100 may store the reconstructed picture (or reconstructed samples or reconstructed blocks) in the memory and utilize the reconstructed picture as a reference picture for inter prediction. As described above, an in-loop filtering procedure for the reconstructed picture may be further applied.

FIGS. 10 and 11 illustrate an inter prediction based video/image decoding method according to an embodiment of the present disclosure and an inter-prediction unit 260 in a decoder according to an embodiment of the present disclosure. Referring to FIGS. 10 and 11, the decoder 200 may perform an operation corresponding to the operation performed by the encoder 100. The decoder 200 may perform a prediction for a current block based on received prediction information and derive prediction samples.

Steps S1010 to S1030 may be performed by the inter-prediction unit 260 of the decoder 200, and residual information of step S1040 may be obtained from bitstream by the entropy decoding unit 210 of the decoder 200. The residual processing unit of the decoder 200 may derive residual samples for the current block based on the residual information. Specifically, the dequantization unit 220 of the decoder 200 may derive transform coefficients by performing dequantization based on quantized transform coefficients derived based on the residual information, and the inverse transform unit 230 of the decoder 200 may derive the residual samples for the current block by performing inverse transform on the transform coefficients. Step S1050 may be performed by the adder 235 or the reconstruction unit of the decoder 200.

Specifically, the decoder 200 may determine a prediction mode for the current block based on prediction information received from the encoder 100 in S1010. A prediction mode determining unit 261 of the decoder 200 may determine which inter prediction mode is applied to the current block based on prediction mode information included in the prediction information.

For example, the prediction mode determining unit 261 may determine whether a merge mode or a (A)MVP mode is applied to the current block based on merge flag. The prediction mode determining unit 261 may also select one among various inter prediction mode candidates based on a mode index. The inter prediction mode candidates may include a skip mode, a merge mode, and/or an (A)MVP mode, or may include various inter prediction modes (e.g., affine merge mode, affine MVP mode) to be described below.

A motion information deriving unit 262 of the decoder 200 may derive the motion information of the current block based on the inter prediction mode determined by the prediction mode determining unit 261 in S1020. For example, when the skip mode or the merge mode is applied to the current block, the motion information deriving unit 262 may construct a merge candidate list to be described below and select one merge candidate among merge candidates included in the merge candidate list. The selection may be performed based on the selection information (merge index). The motion information deriving unit 262 may select the merge candidate based on selection information (e.g., merge index). Motion information of the current block may be derived from motion information of the selected merge candidate. In other words, the motion information of the selected merge candidate may be used as the motion information of the current block.

As another example, when the (A)MVP mode is applied to the current block, the motion information deriving unit 262 may construct an (A)MVP candidate list to be described below and use a motion vector of a selected motion vector predictor (MVP) candidate among MVP candidates included in the (A)MVP candidate list, as an MVP of the current block. The motion information deriving unit 262 may select a motion vector of the MVP candidate based on the above-described selection information (e.g., mvp flag or mvp index). In this case, an MVD of the current block may be derived from information on the MVD. The motion vector of the current block may be derived based on the MVP and the MVD of the current block. Further, a reference picture index of the current block may be derived based on reference picture index information. A picture indicated by the reference picture index in a reference picture list for the current block may be derived as a reference picture that is referred for the inter prediction of the current block.

The motion information of the current block may be derived without candidate list construction. When the motion information of the current block is derived without candidate list construction, the motion information of the current block may be derived according to a procedure disclosed in the prediction mode. In addition, when the motion information of the current block is derived without candidate list construction, the candidate list construction may be omitted.

A prediction sample deriving unit 263 may generate prediction samples for the current block based on the motion information of the current block in S1030. The prediction sample deriving unit 263 may derive the reference picture based on the reference picture index of the current block, and derive the prediction samples of the current block using the samples of the reference block that is indicated by the motion vector of the current block on the reference picture. The prediction sample deriving unit 263 may perform prediction sample filtering on all or some of the prediction samples of the current block.

In other words, the inter-prediction unit 260 of the decoder 200 may include the prediction mode determining unit 261, the motion information deriving unit 262, and the prediction sample deriving unit 263. The decoder may determine the prediction mode for the current block based on the prediction mode information received from the prediction mode determining unit 261, derive the motion information (motion vector and/or reference picture index) of the current block based on information on the motion information received from the motion information deriving unit 262, and derive the prediction samples of the current block in the prediction sample deriving unit 263. For convenience of explanation, the operation performed by the inter-prediction unit 260, the prediction mode determining unit 261, or the prediction sample deriving unit 263 is commonly referred to as the operation of the decoder 200.

The decoder 200 may generate the residual samples for the current block based on the received residual information in S1040. The decoder 200 may generate reconstructed samples for the current block based on the prediction samples and the residual samples and generate a reconstructed picture based on the generated reconstructed samples in S1050. Afterwards, an in-loop filtering procedure for the reconstructed picture may be further applied.

As described above, the inter-prediction procedure may include an inter prediction mode determining step, a motion information deriving step depending on the determined prediction mode, and a prediction performing (prediction sample generating) step based on the derived motion information.

FIG. 12 illustrates an example of motion models according to an embodiment of the present disclosure.

The coding standard technology including high efficiency video coding (HEVC) uses one motion vector to express a motion of a coding block. Although a method of using one motion vector for each block could represent an optimal motion on a per block basis, it may not be actually an optimal motion of each pixel. Thus, if an optimal motion vector can be determined on a per pixel basis, coding efficiency can be increased. Hence, an embodiment of the present disclosure describes a motion prediction method of encoding or decoding a video signal using multiple motion models. In particular, a motion vector may be represented per each pixel of a block or per each sub-block using two to four motion vectors. A prediction method using a plurality of motion vectors may be referred to as affine motion prediction.

The motion model according to an embodiment of the present disclosure may represent a motion model illustrated in FIG. 12. An affine motion prediction method focusing on six motion models is described below.

FIG. 13 illustrates an example of a control point motion vector for affine motion prediction according to an embodiment of the present disclosure.

As illustrated in FIG. 13, the affine motion prediction may determine a motion vector of a pixel location included in a block using two control point motion vector (CPMV) pairs $v_0$ and $v_1$. In this case, a set of the motion vectors is referred to as an affine motion vector field (MVF), and may be determined by the following Equation 1.

$$\begin{cases} v_x = \frac{(v_{1x} - v_{0x})}{w} * x - \frac{(v_{1y} - v_{0y})}{w} * y + v_{0x} \\ v_y = \frac{(v_{1y} - v_{0y})}{w} * x - \frac{(v_{1x} - v_{0x})}{w} * y + v_{0y} \end{cases}$$ [Equation 1]

$v_x(x,y)$ denotes an x-axis element of a motion vector in a subblock (x,y) of a current block 1300, $v_y(x,y)$ denotes a y-axis element of a motion vector in the subblock (x,y) of the current block 1300, w denotes a width of the current block 1300, $v_{0x}$ denotes an x-axis element of a first control point motion vector CPMV0 at the top left of the current block 1300, $v_{0y}$ denotes a y-axis element of the first control point motion vector CPMV0 at the top left of the current block 1300, $v_{1x}$ denotes an x-axis element of a second control point motion vector CPMV1 at the top right of the current block 1300, and $v_{1y}$ denotes a y-axis element of the second control point motion vector CPMV1 at the top right of the current block 1300.

FIG. 14 illustrates an example of a motion vector per each subblock of a block to which affine motion prediction according to an embodiment of the present disclosure is applied.

In an encoding or decoding process, an affine motion vector field (MVF) may be determined on a per pixel basis or on a per block basis. If the affine motion vector field is determined on a per pixel basis, a motion vector may be obtained based on each pixel value. If the affine motion vector field is determined on a per block basis, based on a center pixel value of a block, a motion vector of the corresponding block may be obtained. In the present disclosure, it is assumed that an affine motion vector field (MVF) is determined on a per 4*4 block basis as illustrated in FIG. 14. However, this is merely for convenience of description, and an embodiment of the disclosure is not limited thereto. FIG. 14 illustrates an example where a coding block consists of 16*16 samples and an affine motion vector field (MVF) is determined based on a block of 4*4 size.

FIG. 15 illustrates an example of a neighboring block used for prediction of a current block in an affine inter mode according to an embodiment of the present disclosure.

Affine motion prediction may include an affine merge mode (or AF_MERGE) and an affine inter mode (or AF_INTER). In the affine inter mode (AF_INTER), after 2-control point motion vector prediction (CPMVP) and CPMV are determined, a control point motion vector difference (CPMVD) corresponding to a difference may be transmitted from the encoder 100 to the decoder 200. A detailed coding process of the affine inter mode (AF_INTER) may be given as the following.

Step-1: Determine candidates of two CPMVP pairs

Step-1.1: Determine up to 12 CPMVP candidate combinations (refer to Equation 2)

$$\{(v_0, v_1, v_2) | v_0 = \{v_A, v_B, v_C\}, v_1 = \{v_D, v_E\}, v_2 = \{v_F, v_G\}\}$$ [Equation 2]

In Equation 2, $v_0$ denotes a motion vector CPMV0 at a top left control point 1510 of a current block 1500, $v_1$ denotes a motion vector CPMV1 at a top right control point 1511 of the current block 1500, $v_2$ denotes a motion vector CPMV2 at a bottom left control point 1512 of the current block 1500, $v_A$ denotes a motion vector of a neighboring block A(1520) adjacent to the top left of the top left control point 1510 of the current block 1500, $v_B$ denotes a motion vector of a neighboring block B(1522) adjacent to the top of the top left control point 1510 of the current block 1500, $v_C$ denotes a motion vector of a neighboring block C(1524) adjacent to the left of the top left control point 1510 of the current block 1500, $v_D$ denotes a motion vector of a neighboring block D(1526) adjacent to the top of the top right control point 1511 of the current block 1500, $v_E$ denotes a motion vector of a neighboring block E(1528) adjacent to the top right of the top right control point 1511 of the current block 1500, $v_F$ denotes a motion vector of a neighboring block F(1530) adjacent to the left of the bottom left control point 1512 of the current block 1500, and $v_G$ denotes a motion vector of a neighboring block G(1532) adjacent to the left of the bottom left control point 1512 of the current block 1500.

Step-1.2: Sort CPMVP candidate combinations based on a small difference value (DV) to use top two candidates (refer to Equation 3)

$$DV = |(v_{1x} - v_{0x})*h - (v_{2y} - v_{0y})*w| + |(v_{1y} - v_{0y})*h + (v_{2x} - v_{0x})*w|$$ [Equation 3]

$v_{0x}$ denotes an x-axis element of a motion vector (V0 or CPMV0) of the top left control point 1510 of the current block 1500, $v_{1x}$ denotes an x-axis element of a motion vector (V1 or CPMV1) of the top right control point 1511 of the current block 1500, $v_{2x}$ denotes an x-axis element of a motion vector (V2 or CPMV2) of the bottom left control point 1512 of the current block 1500, $v_{0y}$ denotes a y-axis element of the motion vector (V0 or CPMV0) of the top left control point 1510 of the current block 1500, $v_{1y}$ denotes a y-axis element of the motion vector (V1 or CPMV1) of the top right control point 1511 of the current block 1500, $v_{2y}$ denotes a y-axis element of the motion vector (V2 or CPMV2) of the bottom left control point 1512 of the current block 1500, w denotes a width of the current block 1500, and h denotes a height of the current block 1500.

Step-2: Use an AMVP candidate list if control point motion vector prediction (CPMVP) pair candidate is less than 2

Step-3: Determine control point motion vector prediction (CPMVP) for each of two candidates and optimally select a candidate having a smaller value by comparing RD costs and a CPMV Step-4: Transmit an index corresponding to an optimal candidate and a control point motion vector difference (CPMVD)

FIG. 16 illustrates an example of a neighboring block used for prediction of a current block in an affine merge mode according to an embodiment of the present disclosure.

In the affine merge mode (AF_MERGE), the encoder 100 may perform encoding as in the following process.

Step-1: Scan neighboring blocks A to E (1610, 1620, 1630, 1640, and 1650) of a current coding block 1600 in alphabetical order, and determine a block, that is first encoded to an affine prediction mode based on the scanning order, as a candidate block of affine merge (AF_MERGE)

Step-2: Determine an affine motion model using a control point motion vector (CPMV) of the determined candidate block Step-3: Determine the control point motion vector (CPMV) of the current block 1600 based on the affine motion model of the candidate block and determine the MVF of the current block 1600

FIG. 17 illustrates an example of a block on which affine motion prediction is performed using a neighboring block to which affine motion prediction according to an embodiment of the present disclosure is applied.

For example, as illustrated in FIG. 17, if a block A(1720) is encoded to an affine mode, after the block A(1720) is determined as a candidate block, an affine motion model may be derived using control point motion vectors (CPMVs) v2 and v3 of the block A(1720), and then the control point motion vectors (CPMVs) v0 and v1 of the current block 1700 may be determined. An affine motion vector field (MVF) of the current block 1700 may be determined based on the control point motion vectors (CPMVs) of the current block 1700, and encoding may be performed.

FIG. 18 illustrates an example of a flowchart of an operation for affine motion prediction according to an embodiment of the present disclosure. The affine motion prediction illustrated in FIG. 18 is an example of the prediction performing step S1030 of FIG. 10. Each operation illustrated in FIG. 20 may be performed by the decoder 200. The following describes a method and a device for performing affine prediction based on the operation of the decoder 200, but this is merely for convenience of explanation. Thus, embodiments of the disclosure are not limited to the decoder 200. For example, the substantially same process as operation illustrated in FIGS. 18 to 22b can be performed by the encoder.

In step S1810, the decoder 200 may obtain affine motion information of a current block to be decoded. More specifically, if the decoder 200 checks that the current block to be decoded is a block encoded by affine motion prediction, the decoder 200 may obtain the affine motion information required for the affine motion prediction. For example, the affine motion information may include at least one of an affine motion prediction type (e.g., affine merge or affine MVP), information on an affine motion model, information on a neighboring block, information about whether a neighboring block has been encoded to an affine motion prediction (e.g., affine flag), a motion vector of a neighboring block, an affine motion vector of a neighboring block, information on a reference frame (e.g., index of a reference frame).

In step S1820, the decoder 200 may perform motion prediction on the current block based on the affine motion information obtained in the step S1810. More specifically, the decoder 200 may generate an inherited affine candidate list from among affine motion information of a neighboring block and then select an optimal affine motion from among the inherited affine candidate list to thereby perform the affine motion prediction. The selected optimal affine motion may be indicated by an index generated by the encoder 100. In addition, the decoder 200 may select an optimal affine motion and consider a prediction direction or a motion vector difference (MVD) generated by the encoder 100 to thereby determine an optimal prediction motion vector. Afterwards, the decoder 200 may reconstruct prediction samples from the determined optimal prediction motion information. The process of generating the prediction samples from the control point motion vector of the current block as in the step S1820 may be referred to as an affine motion compensation (MC).

Embodiment 1: MC Block Size for Affine Motion Compensation

As described above, affine motion prediction may be performed at a subblock level not a pixel level, and this is to reduce complexity. Motion compensation (MC) block size M*N of affine prediction actually selected in a joint exploration model (JEM) of versatile video coding (VVC) standard may be determined as the following Equation 4. Herein, the MC block is a unit block of a motion vector generated from a control point motion vector of a current block on which the affine motion prediction is performed, and may be referred to as a subblock. That is, the MC block may correspond to each subblock illustrated in FIG. 14.

$$\begin{cases} M = \text{clip3}\left(4, w, \dfrac{w}{\max(\text{abs}(v_{1x} - v_{0x}), \text{abs}(v_{1y} - v_{0y}))}\right) \\ N = \text{clip3}\left(4, h, \dfrac{h}{\max(\text{abs}(v_{2x} - v_{0x}), \text{abs}(v_{2y} - v_{0y}))}\right) \end{cases}$$ [Equation 4]

In Equation 4, w denotes a width of the current block, h denotes a height of the current block, max(a,b) denotes an operator outputting a maximum value among a or b, abs(a) denotes an operator outputting an absolute value, and clip3 (a,x,b) may be defined by the following Equation 5.

$$\text{clip3} = \begin{cases} a, \text{ if } a > x \\ x, \text{ if } a \le x \le b \\ b, \text{ if } x > b \end{cases}$$ [Equation 5]

According to Equation 4, a minimum MC block size is 4*4, and value of M or N may be 8 or more if a difference of CPMV is sufficiently small. A reason to determine the MC block size using the above Equation 4 is to avoid the minimum block size as much as possible because a lot of cost is incurred from an implementation perspective if the MC block size is sufficiently small. Specifically, in the case of 4*4 MC block, because the number of horizontal interpolations and the number of reference pixels required for the MC increase, the cost is high from the implementation perspective. In the case of actual high efficiency video coding (HEVC) standard, a minimum block size of inter prediction is limited to 4*8 or 8*4. Although the case where the MC block size is 4*4 can be adaptively avoided if the above Equation 4 is used, there is no way to deal with the actual worst case. Even in the average case, because the MC block sizes of most blocks are determined as 4*4, the cost reduction effect resulting from the method of the above Equation 4 is insufficient. Rather, the complexity may increase due to the addition of the process of determining the MC block size (calculation process according to Equation 4). Herein, the high cost may be used as substantially the same sense as high encoding/decoding complexity.

Embodiments of the present disclosure propose a method of using a pre-defined value as a MC block size. Specifically, the following method may be used.

The MC block size may use a pre-defined value, and this value may be decoded by being included in a picture parameter set (PPS) or a slice parameter set (SPS) and may also be determined as the pre-defined value without the decoding process.

The MC block size may be 4*4 or 8*8, and may use a block size larger than that. However, in general, if a block size larger than 8*8 is used, encoding efficiency may deteriorate, and thus the use of the block size larger than 8*8 may not be practical. Thus, the following describes the block size of 4*4 or 8*8, but embodiments of the present disclosure are not limited to these sizes. If a 4*4 block is used, encoding complexity is high, but encoding performance can be maintained. When compared to the case of using Equation 4, it is very likely that the encoding complexity in the worst case is low and the encoding complexity in the average case is also statistically low. If an 8*8 block is used, it suffers a slight loss in the encoding performance, but can benefit greatly in terms of encoding complexity.

According to embodiments of the present disclosure, the MC block size may be determined at a slice level. For example, in case of P-slice that is a slice on which uni-prediction is performed, the number of reference frames is 1, and in case of B-slice that is a slice on which bi-prediction is performed, the number of reference frames is 2. Therefore, encoding complexity of the B-slice may be theoretically two times as compared to encoding complexity of the P-slice. Since the worst case occurs in the B-slice in terms of encoding complexity, the encoding complexity can be reduced by setting an MC block size of the B-slice to be larger, and encoding performance degradation can be minimized by maintaining an MC block size of the P-slice as it is.

According to embodiments of the present disclosure, the MC block size may be determined at a coding block level. For example, if the current block is encoded by the bi-prediction, a size of the MC block may be determined as 8*8, and if the current block is encoded by the uni-prediction, a size of the MC block may be determined as 4*4. In such a case, the encoding performance degradation can be minimized without an increase in the complexity in the worst case.

Embodiment 2: Available Condition 1 for Affine Merge and Affine Inter

As described above, in affine prediction applied to a JEM, an affine merge mode and an affine inter mode may be applied when they satisfy conditions shown in the following Table 2. As shown in Table 2, the affine prediction may be applied when a block size is equal to or greater than a predetermined block size. This is because the affine prediction is generally suitable for a large block. The conditions of the following Table 2 are optimized when an MC block size is determined by Equation 4, and may be changed if the methods for determining the MC block size proposed in the Embodiment 1 are considered.

TABLE 2

| Coding mode | Condition |
| --- | --- |
| Affine merge | width * height >= 64 |
| Affine inter | width >= 16 && height >= 16 |

In Table 2, 'width' denotes a width of a current block, and 'height' denotes a height of the current block.

When the MC block size is fixed to 8*8 and used, available condition shown in the following Table 3 may be considered. A difference between the condition of Table 3 and the condition of Table 2 is additional condition (width>=8 && height>=8) of the affine merge. A reason to consider this is that when the corresponding condition is not considered, a 4*16 block or a 16*4 block satisfies the condition of width*height>=64, but a problem may occur in actual operation because the MC block size is not 8*8.

TABLE 3

| Coding mode | Condition |
| --- | --- |
| Affine merge | width * height >= 64 && width >= 8 && height >= 8 |
| Affine inter | width >= 16 && height >= 16 |

The following Table 4 is an example of generalized condition of the condition of Table 3. When the MC block size is 8*8, 'A' and 'C' values of Table 4 may be equal to or greater than the value determined in Table 3, and may be determined by an experiment. The 'B' value may be determined depending on the MC block size.

TABLE 4

| Coding mode | Condition |
| --- | --- |
| Affine merge | width * height >= A && width >= B && height >= B |
| Affine inter | width >= C && height >= C |

The following Table 5 shows another example of affine motion prediction condition according to an embodiment of the present disclosure. In this instance, the A, B, and C values may be the same as or different from each other. If the A, B, and C values are the same as each other, there may be an advantage of unification from a design perspective. If the A, B, and C values are different from each other, there may be an advantage of performance. The A, B, and C values may be determined by an experiment, but it is preferable that they are basically determined to be equal to or greater than an existing value due to an increase in the block size. In addition, the A, B, and C values are preferred to be equal to or greater than a minimum block size.

TABLE 5

| Coding mode | Condition |
| --- | --- |
| Affine merge | width >= A && height >= A |
| Affine inter | width >= B && height >= B |

Embodiment 3: Available Condition 2 for Affine Merge and Affine Inter

This embodiment proposes conditions that can be applied when an MC block size is determined at a slice level or a coding block level. If the MC block size is determined at the slice level, the following Table 6 may be used. That is, because a block size when a slice to which a current block to be decoded belongs is B-slice may be different from a block size when the slice is P-slice, conditions for performing affine prediction may be separated and considered. In the following Tables 6 and 7, A0, A1, B0, B1, C0, and C1 are values that can be determined by an experiment, and it is preferable that these values satisfy the following conditions.

$A0 >= A1 >= MC$ block size $B0 >= B1 >= MC$ block size $C0 >= C1 >= MC$ block size

TABLE 6

| Coding mode | Condition |
| --- | --- |
| Affine merge | (w * h >= A0 && w >= B0 && h >= B0 && B-slice) \|\| (w * h >= A1 && w >= B1 && h >= B1 && P-slice) |
| Affine inter | (w >= C0 && h >= C0 && B-slice) \|\| (w >= C1 && h >= C1 && P-slice) |

If the MC block size is determined at the block level, the following Table 7 may be used, and other details may be determined in the same manner as the slice level.

TABLE 7

| Coding mode | Condition |
| --- | --- |
| Affine merge | (w * h >= A0 && w >= B0 && h >= B0 && Bi-prediction) \|\| (w * h >= A1 && w >= B1 && h >= B1 && Uni-prediction) |
| Affine inter | (w >= C0 && h >= C0 && Bi- prediction) \|\| (w >= C1 && h >= C1 && Uni-prediction) |

FIG. 19 illustrates another example of a flowchart of an operation for affine motion prediction according to an embodiment of the present disclosure. The flowchart of FIG. 19 illustrates in more detail the flowchart of the operation for affine motion illustrated in FIG. 18. Steps S1910 and S1920 of FIG. 19 may be included in the step S1810 of FIG. 18, and steps S1930 and S1940 of FIG. 19 may be included in the step S1820 of FIG. 18.

In the step S1910, the decoder 200 may check that a current block to be decoded has been encoded by affine prediction. For example, the decoder 200 may check that the current block is encoded by inter-frame prediction. Further, the decoder 200 may check that the current block has at least two control points by checking a motion model index, and a motion prediction is performed based on a motion vector for the at least two control points. When the decoder 200 checks that the current block is encoded by affine prediction, a check for available condition of the affine prediction may be performed. This is described below with reference to FIG. 20 to FIG. 22b.

In the step S1920, the decoder 200 may obtain a control point motion vector of the current block. More specifically, the decoder 200 may obtain motion vectors for a plurality of control points for the current block. The motion vectors for the plurality of control points may be referred to as a control point motion vector (CPMV). For example, if the decoder 200 checks that an affine prediction mode of the current block is an affine merge mode, the decoder 200 may obtain motion vectors for a plurality of control points from a neighboring block adjacent to the current block. Further, if the decoder 200 checks that the affine prediction mode of the current block is an affine inter mode, the decoder 200 may obtain motion vectors for a plurality of control points of the current block, from a difference CPMVD between control point motion vectors of a neighboring block adjacent to the current block, transmitted from the encoder 100. The process of obtaining the CPMV depending on the affine merge mode and the affine inter mode may be described together with FIGS. 15 and 16 illustrated above and the related description.

In the step S1930, the decoder 200 may determine a motion vector of each subblock. More specifically, the decoder 200 may determine motion vectors of respective subblocks included in the current block. The motion vector of each subblock of the current block may be referred to as a motion vector field (MVF). For example, the motion vector of each subblock (x,y) may be determined by Equation 1 described above.

According to embodiments of the present disclosure, a size (width and height) of the subblock may use a pre-defined value. For example, the size of the subblock may be determined as 4*4 or 8*8 and may use other values. Herein, 4*4 represents that four samples are arranged in each of a row direction and a column direction of a subblock, and 8*8 represents that eight samples are arranged in each of a row direction and a column direction of a subblock. The size of the subblock may be decoded and determined at PPS or SPS, or may use a pre-defined value. By using a pre-defined value as the size of the subblock, the present disclosure can limit the use of very small subblocks and omit a separate calculation procedure, thereby reducing computational complexity.

According to embodiments of the present disclosure, sizes of respective subblocks may be differently set depending on an inter-frame prediction type of the current block. For example, if the current block is a block encoded by bi-prediction, a size of each subblock may be set to 8*8, and if the current block is a block encoded by uni-prediction, a size of each subblock may be set to 4*4. Further, if a slice to which the current block belongs is P-slice, the size of the subblock may be set to 4*4, and if a slice to which the current block belongs is B-slice, the size of the subblock may be set to 8*8. 4*4 and 8*8 as the size of the subblock are merely an example, and various other values may be used.

Since the bi-prediction has the larger encoding complexity than the uni-prediction, the present disclosure can minimize encoding performance degradation for the uni-prediction while reducing the encoding complexity by setting the subblock size to be larger upon the bi-prediction.

In the step S1940, the decoder 200 may generate prediction samples for the current block. More specifically, the decoder 200 may generate sample values for respective samples included in the current block by referring to a reference picture using the motion vector of the subblocks determined in the step S1930.

FIG. 20 illustrates an example of a flowchart of an operation for checking whether affine motion prediction according to an embodiment of the present disclosure is available. More specifically, FIG. 20 illustrates an example of a process of checking affine prediction of a current block in the step S1910 of FIG. 19.

In step S2010, the decoder 200 may check a coding mode of a current block. More specifically, the decoder 200 may check a coding mode related to affine motion prediction of the current block. For example, the coding mode may include an affine merge mode or an affine inter mode. In other words, the decoder 200 may determine whether to perform the affine motion prediction on the current block by one mode of the affine merge mode or the affine inter mode.

In step S2020, the decoder 200 may check whether a size condition of the current block is satisfied. More specifically, the decoder 200 may check whether the size of the current block satisfies the size condition according to the coding mode of the current block. For example, the decoder 200 may determine whether a width and a height of the current block satisfy a pre-defined condition. The size condition of the current block for the affine motion prediction per coding mode may be set by at least one of the above Tables 2 to 7. A process of checking the size condition is described in detail below with reference to FIGS. 21a to 22b.

In step S2030, the decoder 200 may check whether affine prediction of the current block is available. More specifically, if the size of the current block satisfies the condition in the step S2020, the decoder 200 may check that the affine motion prediction can be performed on the current block. Afterwards, the decoder 200 may proceed to the step S1920 of FIG. 19 and may obtain the control point motion vector of the current block.

FIGS. 21a and 21b illustrate an example of a flowchart of an operation for checking condition for whether affine motion prediction is available based on a block size according to an embodiment of the present disclosure. More specifically, FIGS. 21a and 21b illustrate an example of a step checking whether size condition in the step S2020 of FIG. 20 is satisfied.

FIG. 21a illustrates an example of the case of setting the size condition of Table 5 described above. In step S2110 of FIG. 21a, the decoder 200 may determine whether a current block has been encoded by an affine merge mode. For example, the decoder 200 may determine whether the current block has been encoded by the affine merge mode or has been encoded by an affine inter mode.

If the current block is encoded by the affine merge mode, the decoder 200 may proceed to step S2120 and may check whether a size of the current block satisfies a size condition according to the affine merge mode. For example, as illustrated in FIG. 21a, the decoder 200 may determine whether a width of the current block is greater than or equal to a first reference value A, and a height of the current block is greater than or equal to the first reference value A. The first reference value A may be set to 8.

If the current block is not encoded by the affine merge mode (i.e., if the current block is encoded by the affine inter mode), the decoder 200 may proceed to step S2125 and may determine whether the size of the current block satisfies a size condition according to the affine inter mode. For example, as illustrated in FIG. 21a, the decoder 200 may determine whether a width of the current block is greater than or equal to a second reference value B, and a height of the current block is greater than or equal to the second reference value B. The second reference value B may be set to 16.

If the size of the current block satisfies condition of the step S2120 or S2125, the decoder 200 may proceed to step S2130 and check that affine motion prediction for the current block is available. For example, the decoder 200 sets a flag representing whether the affine motion prediction for the current block is available to 1, and may proceed to a next step.

If the size of the current block does not satisfy the condition of the step S2120 or S2125, the decoder 200 may proceed to step S2140 and check that affine motion prediction for the current block is not available. For example, the decoder 200 sets the flag representing whether the affine motion prediction for the current block is available to 0, does not perform the affine motion prediction, and may perform other operation.

FIG. 21b illustrates an example of the case of setting the size condition of Tables 3 and 4 described above. In step S2160 of FIG. 21b, the decoder 200 may determine whether a current block has been encoded by an affine merge mode. For example, the decoder 200 may determine whether the current block has been encoded by the affine merge mode or has been encoded by an affine inter mode.

If the current block is encoded by the affine merge mode, the decoder 200 may proceed to step S2170 and may check whether a size of the current block satisfies a size condition according to the affine merge mode. For example, as illustrated in FIG. 21b, the decoder 200 may determine whether the product of a width and a height of the current block is greater than or equal to a first affine merge reference value A, the width of the current block is greater than or equal to a second affine merge reference value B, and the height of the current block is greater than or equal to the second affine merge reference value B. The first affine merge reference value may be set to 64, and the second affine merge reference value may be set to 8. The first affine merge reference value may be set to the square of the second affine merge reference value, and the first affine merge reference value and the second affine merge reference value may be variously set according to an embodiment.

If the current block is not encoded by the affine merge mode (i.e., if the current block is encoded by the affine inter mode), the decoder 200 may proceed to step S2175 and may determine whether the size of the current block satisfies a size condition according to the affine inter mode. For example, as illustrated in FIG. 21b, the decoder 200 may determine whether a width of the current block is greater than or equal to an affine inter reference value C, and a height of the current block is greater than or equal to the affine inter reference value C. The affine inter reference value C may be set to 16.

If the size of the current block satisfies condition of the step S2170 or S2175, the decoder 200 may proceed to step S2180 and check that affine motion prediction for the current block is available. For example, the decoder 200 sets a flag representing whether the affine motion prediction for the current block is available to 1, and may proceed to a next step.

If the size of the current block does not satisfy the condition of the step S2170 or S2175, the decoder 200 may proceed to step S2190 and check that affine motion prediction for the current block is not available. For example, the decoder 200 sets the flag representing whether the affine motion prediction for the current block is available to 0, does not perform the affine motion prediction, and may perform other operation.

FIGS. 22a and 22b illustrate an example of a flowchart of an operation for checking condition for whether affine motion prediction is available based on a block size according to an embodiment of the present disclosure. More specifically, FIGS. 22a and 22b illustrate another example of a step checking whether size condition in the step S2020 of FIG. 20 is satisfied.

FIG. 22a illustrates an example of the case of setting the size condition of Table 6 in which the block size is determined at the slice level as described above. In step S2210 of FIG. 22a, the decoder 200 may determine whether a current block has been encoded by an affine merge mode. For example, the decoder 200 may determine whether the current block has been encoded by the affine merge mode or has been encoded by an affine inter mode.

If the current block is encoded by the affine merge mode, the decoder 200 may proceed to step S2220 and may check whether a size of the current block satisfies a size condition according to the affine merge mode. For example, as illustrated in FIG. 22a, the size condition according to the affine merge mode is a case where the product of a width (w) and a height (h) of the current block is greater than or equal to a third reference value A0, the width (w) of the current block is greater than or equal to a fourth reference value B0, the height (h) of the current block is greater than or equal to the fourth reference value B0, and a slice to which the current block belongs is B-slice, or a case where the product of the width (w) and the height (h) of the current block is greater than or equal to a fifth reference value A1, the width (w) of the current block is greater than or equal to a sixth reference value B1, the height (h) of the current block is greater than or equal to the sixth reference value B1, and a slice to which the current block belongs is P-slice. The third reference value A0 may be set to be greater than or equal to the fifth reference value A1, and the fifth reference value A1 may be set to be greater than or equal to the size of the subblock (A0>=A1>=MC block size). Further, the fourth reference value B0 may be set to be greater than or equal to the sixth reference value B1, and the sixth reference value B1 may be set to be greater than or equal to the size of the subblock (B0>=B1>=MC block size).

If the current block is not encoded by the affine merge mode (i.e., if the current block is encoded by the affine inter mode), the decoder 200 may proceed to step S2225 and may determine whether the size of the current block satisfies a size condition according to the affine inter mode. For example, as illustrated in FIG. 22a, the size condition according to the affine inter mode is a case where a slice to which the current block belongs is B-slice, a width (w) of the current block is greater than or equal to a seventh reference value C0, and a height (h) of the current block is greater than or equal to the seventh reference value C0, or a case where a slice to which the current block belongs is P-slice, a width (w) of the current block is greater than or equal to an eighth reference value C1, and a height (h) of the current block is greater than or equal to the eighth reference value C1. The seventh reference value C0 may be set to be greater than or equal to the eighth reference value C1, and the eighth reference value C1 may be set to be greater than or equal to the size of the subblock (C0>=C1>=MC block size).

If the size of the current block satisfies condition of the step S2220 or S2225, the decoder 200 may proceed to step S2230 and check that affine motion prediction for the current block is available. For example, the decoder 200 sets a flag representing whether the affine motion prediction for the current block is available to 1, and may proceed to a next step.

If the size of the current block does not satisfy the condition of the step S2220 or S2225, the decoder 200 may proceed to step S2240 and check that affine motion prediction for the current block is not available. For example, the decoder 200 sets the flag representing whether the affine motion prediction for the current block is available to 0, does not perform the affine motion prediction, and may perform other operation.

FIG. 22b illustrates an example of the case of setting the size condition of Table 7 in which the block size is determined at the block level as described above. In step S2260 of FIG. 22b, the decoder 200 may determine whether a current block has been encoded by an affine merge mode. For example, the decoder 200 may determine whether the current block has been encoded by the affine merge mode or has been encoded by an affine inter mode.

If the current block is encoded by the affine merge mode, the decoder 200 may proceed to step S2270 and may check whether a size of the current block satisfies a size condition according to the affine merge mode.

As illustrated in FIG. 22b, the size condition according to the affine merge mode is a case where the product of a width (w) and a height (h) of the current block is greater than or equal to a third reference value A0, the width (w) of the current block is greater than or equal to a fourth reference value B0, the height (h) of the current block is greater than or equal to the fourth reference value B0, and the current block has been encoded by bi-prediction, or a case where the product of the width (w) and the height (h) of the current block is greater than or equal to a fifth reference value A1, the width (w) of the current block is greater than or equal to a sixth reference value B1, the height (h) of the current block is greater than or equal to the sixth reference value B1, and the current block has been encoded by uni-prediction. The third reference value A0 may be set to be greater than or equal to the fifth reference value A1, and the fifth reference value A1 may be set to be greater than or equal to the size of the subblock (A0>=A1>=MC block size). Further, the fourth reference value B0 may be set to be greater than or equal to the sixth reference value B1, and the sixth reference value B1 may be set to be greater than or equal to the size of the subblock (B0>=B1>=MC block size).

If the current block is not encoded by the affine merge mode (i.e., if the current block is encoded by the affine inter mode), the decoder 200 may proceed to step S2275 and may determine whether the size of the current block satisfies a size condition according to the affine inter mode. For example, as illustrated in FIG. 22b, the size condition according to the affine inter mode is a case where the current block has been encoded by bi-prediction, a width (w) of the current block is greater than or equal to a seventh reference value C0, and a height (h) of the current block is greater than or equal to the seventh reference value C0, or a case where the current block has been encoded by uni-prediction, a width (w) of the current block is greater than or equal to an eighth reference value C1, and a height (h) of the current block is greater than or equal to the eighth reference value C1. The seventh reference value C0 may be set to be greater than or equal to the eighth reference value C1, and the eighth reference value C1 may be set to be greater than or equal to the size of the subblock (C0>=C1>=MC block size).

If the size of the current block satisfies condition of the step S2270 or S2275, the decoder 200 may proceed to step S2280 and check that affine motion prediction for the current block is available. For example, the decoder 200 sets a flag representing whether the affine motion prediction for the current block is available to 1, and may proceed to a next step.

If the size of the current block does not satisfy the condition of the step S2270 or S2275, the decoder 200 may proceed to step S2290 and check that affine motion prediction for the current block is not available. For example, the decoder 200 sets the flag representing whether the affine motion prediction for the current block is available to 0, does not perform the affine motion prediction, and may perform other operation.

FIG. 23 illustrates an example of a video coding system as an embodiment to which the present disclosure is applied.

The video coding system may include a source device and a receiving device. The source device may transfer encoded video/image information or data to the receiving device through a digital storage medium or network in a file or streaming form.

The source device may include a video source, an encoding apparatus, and a transmitter. The receiving device may include a receiver, a decoding apparatus, and a renderer. The encoding apparatus may be called a video/image encoding apparatus and the decoding apparatus may be called a video/image decoding apparatus. The transmitter may be included in the encoding apparatus. The receiver may be included in the decoding apparatus. The renderer may include a display unit and the display unit may be configured as a separate device or an external component.

A video source may acquire a video/image through a capturing, synthesizing, or generating process of the video/image. The video source may include a video/image capture device and/or a video/image generation device. The video/image capture device may include, for example, one or more cameras, video/image archives including previously captured video/images, and the like. The video/image generation device may include, for example, a computer, a tablet, and a smart phone and may (electronically) generate the video/image. For example, a virtual video/image may be generated by the computer, etc., and in this case, the video/image capturing process may be replaced by a process of generating related data.

The encoding apparatus may encode an input video/image. The encoding apparatus may perform a series of procedures including prediction, transform, quantization, and the like for compression and coding efficiency. The encoded data (encoded video/image information) may be output in the bitstream form.

The transmitter may transfer the encoded video/image information or data output in the bitstream to the receiver of the receiving device through the digital storage medium or network in the file or streaming form. The digital storage medium may include various storage media such as USB, SD, CD, DVD, Blu-ray, HDD, SSD, and the like. The transmitter may include an element for generating a media file through a predetermined file format and may include an element for transmission through a broadcast/communication network. The receiver may extract the bitstream and transfer the extracted bitstream to the decoding apparatus.

The decoding apparatus performs a series of procedures including dequantization, inverse transform, prediction, etc., corresponding to an operation of the encoding apparatus to decode the video/image.

The renderer may render the decoded video/image. The rendered video/image may be displayed by the display unit.

FIG. 24 illustrates an example of a video streaming system as an embodiment to which the present disclosure is applied.

Referring to FIG. 24, a content streaming system to which the present disclosure is applied may roughly include an encoding server, a streaming server, a web server, a media storage, a user device, and a multimedia input device.

The encoding server compresses contents input from multimedia input devices including a smartphone, a camera, a camcorder, etc., into digital data to serve to generate the bitstream and transmit the bitstream to the streaming server. As another example, when the multimedia input devices including the smartphone, the camera, the camcorder, etc., directly generate the bitstream, the encoding server may be omitted.

The bitstream may be generated by the encoding method or the bitstream generating method to which the present disclosure is applied and the streaming server may temporarily store the bitstream in the process of transmitting or receiving the bitstream.

The streaming server transmits multimedia data to the user device based on a user request through a web server, and the web server serves as an intermediary for informing a user of what service there is. When the user requests a desired service to the web server, the web server transfers the requested service to the streaming server and the streaming server transmits the multimedia data to the user. In this case, the content streaming system may include a separate control server and in this case, the control server serves to control a command/response between respective devices in the content streaming system.

The streaming server may receive contents from the media storage and/or the encoding server. For example, when the streaming server receives the contents from the encoding server, the streaming server may receive the contents in real time. In this case, the streaming server may store the bitstream for a predetermined time in order to provide a smooth streaming service.

Examples of the user device may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smart watch, a smart glass, or a head mounted display (HMD), etc., and the like.

Each server in the content streaming system may be operated as a distributed server and in this case, data received by each server may be distributed and processed.

As described above, the embodiments described in the present disclosure may be implemented and performed on a processor, a microprocessor, a controller, or a chip. For example, functional units illustrated in each drawing may be implemented and performed on a computer, the processor, the microprocessor, the controller, or the chip.

In addition, the decoder and the encoder to which the present disclosure may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VoD) service providing device, an OTT (Over the top) video device, an Internet streaming service providing devices, a 3 dimensional (3D) video device, a video telephone video device, a transportation means terminal (e.g., a vehicle terminal, an airplane terminal, a ship terminal, etc.), and a medical video device, etc., and may be used to process a video signal or a data signal. For example, the Over the top (OTT) video device may include a game console, a Blu-ray player, an Internet access TV, a home theater system, a smartphone, a tablet PC, a digital video recorder (DVR), and the like.

In addition, a processing method to which the present disclosure is applied may be produced in the form of a program executed by the computer, and may be stored in a computer-readable recording medium. Multimedia data having a data structure according to the present disclosure may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network.

In addition, the embodiment of the present disclosure may be implemented as a computer program product by a program code, which may be performed on the computer by the embodiment of the present disclosure. The program code may be stored on a computer-readable carrier.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Hereinabove, the preferred embodiments of the present disclosure are disclosed for an illustrative purpose and hereinafter, modifications, changes, substitutions, or additions of various other embodiments will be made within the technical spirit and the technical scope of the present disclosure disclosed in the appended claims by those skilled in the art.

The invention claimed is:

1. A method for processing a video signal based on an affine motion prediction by an apparatus, the method comprising:
    checking information on the affine motion prediction of a current block;
    obtaining motion vectors for a plurality of control points of the current block based on the information on the affine motion prediction;
    determining a motion vector for each subblock of a plurality of subblocks included in the current block based on the motion vectors for the plurality of control points; and
    generating a prediction sample for the current block based on the motion vector for each subblock of the plurality of subblocks,
    wherein the step of checking the information on the affine motion prediction of the current block further comprises
        determining whether a width and a height of the current block satisfy a condition corresponding to the information on the affine motion prediction; and
        obtaining the information on the affine motion prediction of the current block based on that the condition is satisfied,
    wherein how to perform the affine motion prediction is determined based on the information on the affine motion prediction, and
    wherein if the information on the affine motion prediction includes an affine merge mode, the condition is based on checking whether a width and a height of the current block is greater than or equal to 8.

2. The method of claim 1, wherein if the information on the affine motion prediction includes an affine inter mode, the condition is based on checking whether a width and a height of the current block is greater than or equal to a first reference value.

3. The method of claim 2, wherein the first reference value is 16.

4. The method of claim 1,
    wherein
    the condition is satisfied based on (i) the current block has been encoded by a bi-prediction, and a width and a height of the current block is greater than or equal to a third reference value, or (ii) the current block has been encoded by a uni-prediction, and a width and a height of the current block is greater than or equal to a fourth reference value,
    wherein the third reference value is greater than or equal to the width or the height of the subblock, the third reference value is greater than or equal to the fourth reference value, and the fourth reference value is greater than or equal to the width or the height of a subblock.

5. The method of claim 1,
    wherein
    the condition is satisfied based on (i) the current block has been encoded by a bi-prediction, a product of a width and a height of the current block is greater than or equal to a fifth reference value, and the width and the height of the current block is greater than or equal to a sixth reference value, or (ii) the current block has been encoded by a uni-prediction, a product of the width and the height of the current block is greater than or equal to a seventh reference value, and the width and the height of the current block is greater than or equal to a eighth reference value,
    wherein the fifth reference value is greater than or equal to the seventh reference value, and the seventh reference value is greater than or equal to a width or a height of a subblock.

6. A non-transitory computer readable medium storing a bitstream causing an image decoding apparatus to perform an image decoding method, the image decoding method comprising
    checking information on an affine motion prediction of a current block;
    obtaining motion vectors for a plurality of control points of the current block based on the information on the affine motion prediction;
    determining a motion vector for each subblock of a plurality of subblocks included in the current block based on the motion vectors for the plurality of control points; and
    generating a prediction sample for the current block based on the motion vector for each subblock of the plurality of subblocks,
    wherein the step of checking the information on the affine motion prediction of the current block further comprises determining whether a width and a height of the current block satisfy a condition corresponding to the information on the affine motion prediction; and obtaining the information on the affine motion prediction of the current block based on that the condition is satisfied, wherein, how to perform the affine motion prediction is determined based on the information on the affine motion prediction, and wherein if the information on the affine motion prediction includes an affine merge mode, the condition is based on checking whether a width and a height of the current block is greater than or equal to 8.

7. A method for encoding a video signal by an apparatus, the method comprising:

obtaining motion vectors for a plurality of control points of a current block;

determining a motion vector for each subblock of a plurality of subblocks included in the current block based on the motion vectors for the plurality of control points;

generating information on an affine motion prediction of the current block; and generating a prediction sample for the current block based on the motion vector for each subblock of the plurality of subblocks, wherein the step of generating information on the affine motion prediction of the current block further comprises checking whether a width and a height of the current block is greater than or equal to 8; and generating the information on the affine motion prediction of the current block based on the width and the height of the current block is greater than or equal to 8, wherein the information on the affine motion prediction includes an affine merge mode, wherein, how to perform the affine motion prediction is determined based on the information on the affine motion prediction.

8. The method of claim 7, wherein the step of generating information on the affine motion prediction of the current block further comprises checking whether a width and a height of the current block is greater than or equal to 16; and generating the information on the affine motion prediction of the current block based on the width and the height of the current block is greater than or equal to 16, wherein the information on the affine motion prediction includes an affine inter mode.

\* \* \* \* \*